United States Patent
Hikita et al.

(10) Patent No.: US 11,071,954 B2
(45) Date of Patent: Jul. 27, 2021

(54) POROUS MEMBRANE, MEMBRANE MODULE, WATER TREATMENT DEVICE, AND METHOD FOR MANUFACTURING POROUS MEMBRANE

(71) Applicant: Mitsubishi Chemical Corporation, Chiyoda-ku (JP)

(72) Inventors: Shingo Hikita, Tokyo (JP); Masashi Teramachi, Tokyo (JP); Yuuki Fujii, Tokyo (JP); Megumi Kubo, Tokyo (JP); Ami Shinoda, Tokyo (JP); Hiroki Fukuta, Tokyo (JP); Seiichiro Mori, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/569,420

(22) Filed: Sep. 12, 2019

(65) Prior Publication Data

US 2020/0023322 A1    Jan. 23, 2020

Related U.S. Application Data

(63) Continuation of application No. PCT/JP2018/012517, filed on Mar. 27, 2018.

(30) Foreign Application Priority Data

Mar. 27, 2017 (JP) ............................ JP2017-061772
Nov. 10, 2017 (JP) ............................ JP2017-217681

(51) Int. Cl.
*B01D 67/00* (2006.01)
*B01D 69/10* (2006.01)
(Continued)

(52) U.S. Cl.
CPC ............ *B01D 71/80* (2013.01); *B01D 63/02* (2013.01); *B01D 67/006* (2013.01); *B01D 69/08* (2013.01);
(Continued)

(58) Field of Classification Search
CPC .... B01D 71/34; B01D 71/40; B01D 2325/36; C08L 33/14
See application file for complete search history.

(56) References Cited

U.S. PATENT DOCUMENTS

2006/0073467 A1    4/2006    Kuno et al.
2011/0207841 A1    8/2011    Kosar et al.
(Continued)

FOREIGN PATENT DOCUMENTS

CN    1662569 A    8/2005
CN    102292115 A    12/2011
(Continued)

OTHER PUBLICATIONS

Tao, Mimi et al—"Hydrophilic poly(vinylidene fluoride) (PVDF) membrane by in situ polymerisation of 2-hydroxyethyl methacrylate HEMA) and micro-phase separation"—Journal of Materials Chemistry, 2012, 22, 9131 (Year: 2012).*

(Continued)

*Primary Examiner* — Bradley R Spies
(74) *Attorney, Agent, or Firm* — Oblon, McClelland, Maier & Neustadt, L.L.P.

(57) ABSTRACT

Provided is a porous membrane that can be manufactured in uncomplicated steps, has high hydrophilicity and water permeability, and exhibits excellent anti-fouling properties when used in a membrane bioreactor method (MBR method). The porous membrane of the present invention is a porous membrane containing polymer (A) and polymer (Continued)

(B), wherein the polymer (A) is a membrane-forming polymer, the polymer (B) is a polymer having a unit (b1) represented by formula (1) and a unit (b2) based on hydroxyl group-containing (meth)acrylate, and the concentration (mass %) of the unit (b1) is equal to or higher than the concentration (mass %) of the unit (b2) in the porous membrane.

[Chem. 1]

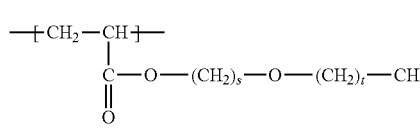

(1)

18 Claims, 4 Drawing Sheets

(51) Int. Cl.
B01D 71/40 (2006.01)
B01D 71/80 (2006.01)
B01D 63/02 (2006.01)
B01D 69/08 (2006.01)

(52) U.S. Cl.
CPC ............ *B01D 69/10* (2013.01); *B01D 71/40* (2013.01); *B01D 2315/06* (2013.01); *B01D 2325/02* (2013.01); *B01D 2325/36* (2013.01)

(56) References Cited

U.S. PATENT DOCUMENTS

| | | | |
|---|---|---|---|
| 2011/0226689 A1 | 9/2011 | Komori et al. | |
| 2012/0024779 A1* | 2/2012 | Ochiai | C09D 133/10 210/506 |
| 2015/0343392 A1 | 12/2015 | Hikita et al. | |
| 2016/0038884 A1 | 2/2016 | Hikita et al. | |
| 2017/0348644 A1 | 12/2017 | Mizuta et al. | |
| 2018/0290110 A1 | 10/2018 | Hikita et al. | |

FOREIGN PATENT DOCUMENTS

| | | |
|---|---|---|
| CN | 103080249 A | 5/2013 |
| CN | 104870081 A | 8/2015 |
| CN | 105209162 A | 12/2015 |
| JP | 2001-500542 A | 1/2001 |
| JP | 2006-205067 A | 8/2006 |
| JP | 2012-506772 A | 3/2012 |
| JP | 5732719 B2 | 6/2015 |
| JP | 5768928 B2 | 8/2015 |
| JP | 2016-13539 A | 1/2016 |
| JP | 2016-77570 A | 5/2016 |
| JP | 6004120 B1 | 10/2016 |
| SG | 187606 A1 | 3/2013 |
| WO | WO 98/08595 A2 | 3/1998 |
| WO | WO 2014/098234 A1 | 6/2014 |
| WO | WO 2014/142311 A1 | 9/2014 |
| WO | WO 2016/190416 A1 | 12/2016 |

OTHER PUBLICATIONS

Bednarek, Melania et al—"Novel Polymers Based on Atom Transfer Radical Polymerization of 2-Methoxyethyl Acrylate"—Journal of Polymer Science: Part A: Polymer Chemistry vol. 45-2007 (Year: 2007).*

Extended European Search Report dated Mar. 3, 2020 European Patent Application No. 18777604.2, 7 pages.

Zhang, P.-Y., et al., "Preparation and Characterization of PVDF-P(PEGMA-r-MMA) ultrafiltration blend membranes via simplified blend method", Desalination, vol. 319, XP055669868, Jun. 1, 2013, NL ISSN: 0011-9164, DOI: 10.1016/j.desal.2013.04.001, pp. 47-59.

International Search Report dated Jun. 12, 2018 in PCT/JP2018/012517 filed Mar. 27, 2018 (with English Translation).

Written Opinion dated Jun. 12, 2018 in PCT/JP2018/012517 filed Mar. 27, 2018.

Office Action dated Mar. 25, 2021 in Indian Patent Application No. 201917035578 (with English translation).

Office Action dated May 6, 2021, in Chinese Patent Application No. 201880020900.9 filed Mar. 27, 2018 (with English translation), citing documents AO-AR and AT.

Makoto Ide, et al., "Structure of Water Sorbed into Poly (MEA-co-HEMA) Films as Examined by ATR-IR Spectroscopy", Langmuir, vol. 19, No. 2, pp. 429-435 (Sep. 16, 2002).

* cited by examiner

POROUS MEMBRANE, MEMBRANE MODULE, WATER TREATMENT DEVICE, AND METHOD FOR MANUFACTURING POROUS MEMBRANE

This application is a continuation application of International Application No. PCT/JP2018/012517, filed on Mar. 27, 2018, which claims the benefit of priority of the prior Japanese Patent Application No. 2017-061772, filed Mar. 27, 2017, and Japanese Patent Application No. 2017-217681, filed Nov. 10, 2017, the content of which are incorporated herein by reference.

TECHNICAL FIELD

The present invention relates to a porous membrane, a membrane module, a water treatment device, and a method for manufacturing a porous membrane.

BACKGROUND ART

Porous membranes are used in various fields such as manufacturing of drinking water, water treatment such as water purification treatment, wastewater treatment, and the like.

In recent years, porous membranes have been required to have high fractionation performance and membrane performance like hydrophilicity. In addition, steps when manufacturing a porous membrane also have been required to be simplified.

The following matters about porous membranes are known.

Patent Literature 1 discloses manufacturing of a porous membrane having permeation flux and hydrophilicity using copolymers having amphiphilic blocks by synthesizing the copolymer in controlled radical polymerization since it was not possible in conventional free radical polymerization to design control of a polymer segment and adjustment of physical properties as intended.

Patent Literature 2 discloses a polyvinylidene fluoride-based resin porous membrane exhibiting excellent low fouling properties, in which a polyvinylidene fluoride resin is combined with a polyvinyl pyrrolidone resin and an acrylic ester resin.

Patent Literature 3 discloses a hydrophilic porous membrane containing polyvinylidene fluoride and a polyvinyl pyrrolidone-based resin that are membrane-forming polymers, and a copolymer obtained by copolymerizing a (meth)acrylic ester macromonomer and a hydrophilic (meth)acrylic ester.

In addition, the following components are known as a hydrophilic porous membrane.

Patent Literature 1 discloses a polymer membrane containing 99 to 20 mass % of hydrophobic matrix polymers and 1 to 80 mass % of amphiphilic block copolymers that have at least one hydrophilic block and at least one hydrophobic block and is compatible with a polymer matrix.

Patent Literature 4 discloses a separation membrane that is a separation membrane having a separation function layer in which the separation function layer contains a polyvinylidene fluoride-based resin having a melt viscosity of 3,300 Pa·s or more, the separation function layer has a three-dimensional mesh structure, the separation function layer is formed by a non-solvent induced phase separation method, the separation function layer further contains a hydrophilic polymer, and the hydrophilic polymer is one or more kinds of polymer selected from a polyvinyl pyrrolidone resin, an acrylic resin, and a cellulose ester-based resin.

Patent Literature 5 discloses a porous membrane formed of a resin composition containing a membrane-forming polymer and a hydrophilic polymer obtained by polymerizing a monomer composition including a methacrylate ester macromonomer and other monomers (a hydrophilic (meth)acrylic ester, and the like).

CITATION LIST

Patent Literature

[Patent Literature 1] JP 2012-506772
[Patent Literature 2] JP 2006-205067
[Patent Literature 3] WO 2014/142311
[Patent Literature 4] JP 5732719
[Patent Literature 5] JP 5768928

SUMMARY OF INVENTION

Technical Problem

However, according to Patent Literature 1, controlled radical polymerization needs to be substantially used to synthesize block copolymers in manufacturing of a porous membrane. Thus, each of the block copolymers needs to be synthesized stepwise, which causes the manufacturing steps to be complicated.

The porous membrane disclosed in Patent Literature 2 has anti-fouling properties due to polyvinylpyrrolidone contained in the membrane. However, since polyvinylpyrrolidone is water-soluble, it dissolves in water when the porous membrane is in use. Thus, there is a problem of the anti-fouling properties of the porous membrane gradually deteriorating when it is being used. In addition, polyvinylpyrrolidone has a problem of being easily degraded by oxidants such as a sodium hypochlorite aqueous solution used when the porous membrane is in use.

Although Patent Literature 3 discloses a uniform porous membrane using a (meth)acrylic ester macromonomer and a polyvinylpyrrolidone resin, the document does not disclose anti-fouling properties.

In addition, since controlled radical polymerization is substantially used in synthesis of the amphiphilic block copolymers contained in the polymeric membrane of Patent Literature 1, each of the blocks needs to be synthesized stepwise, and thus manufacturing thereof becomes complicated. In addition, since the polymeric membrane of Patent Literature 1 does not have a multilayer structure, the entire polymeric membrane needs to contain amphiphilic block copolymers to exhibit hydrophilicity. Thus, a large quantity of amphiphilic block copolymers is required, and thus a manufacturing cost for the polymeric membrane increases.

Since the separation membrane of Patent Literature 4 includes a separation function layer having the mesh structure on a spherulite structure, the membrane forming steps need to be divided into two stages, which leads to manufacturing thereof becoming complicated. In addition, although the virus removal performance thereof is better, the separation membrane is not designed with the intention of imparting anti-fouling properties in a membrane bioreactor method (MBR method).

Since the porous membrane of Patent Literature 5 does not have a multilayer structure, the entire porous membrane needs to contain a specific hydrophilic polymer to exhibit hydrophilicity. Thus, a large quantity of hydrophilic polymers is needed, and thus a manufacturing cost for the porous membrane increases.

An object of an aspect of the present invention is to provide a porous membrane that can be manufactured in uncomplicated steps, has high hydrophilicity and water permeability and exhibits excellent anti-fouling properties when it is used in the membrane bioreactor method (MBR method).

In addition, an object of another aspect of the present invention is to provide a porous membrane that has high hydrophilicity and water permeability, exhibits excellent anti-fouling properties when it is used in the MBR method, and can be simply manufactured at low cost, a method for manufacturing the porous membrane, a membrane module and water treatment device using the porous membrane.

Solution to Problem

The present invention has the following aspects.

[1] A porous membrane comprising polymer (A) and polymer (B), in which the polymer (A) is a membrane-forming polymer, the polymer (B) is a polymer having a unit (b1) represented by formula (1) below:

[Chem. 1]

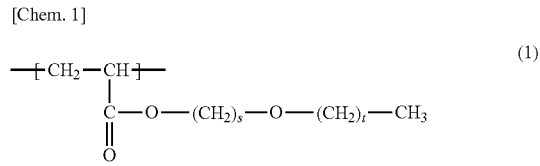

(1)

(in the formula, s is 2 or 3 and t is an integer of 0 to 2), and a unit (b2) based on hydroxyl group-containing (meth) acrylate, and the concentration (mass %) of the unit (b1) is equal to or higher than the concentration (mass %) of the unit (b2) in the porous membrane.

[2] The porous membrane described in [1], in which the polymer (B) further has a unit (b3) having a group represented by formula (2) below:

[Chem. 2]

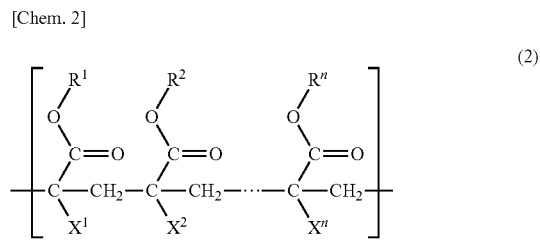

(2)

(in the formula, $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000).

[3] The porous membrane described in [2], in which the unit (b1) is a unit based on 2-methoxyethyl acrylate.

[4] The porous membrane described in any one of [1] to [3], which is a porous membrane that filtrates water to be treated to turn it into treated water, the porous membrane having a plurality of porous layers containing the polymer (A), in which, among the plurality of porous layers, the concentration (mass %) of the polymer (B) among all polymers contained in at least an outermost layer of the porous membrane on the side of water to be treated is higher than the concentration (mass %) of the polymer (B) among all polymers contained in the porous layers other than the outermost layer.

[5] The porous membrane described in any one of [1] to [4], in which a form of the membrane is a hollow fiber membrane.

[6] The porous membrane described in any one of [1] to [5], further including a support in the porous membrane.

[7] A membrane module including the porous membrane described in any one of [1] to [6].

[8] A water treatment device including the membrane module described in [7].

[9] A method for manufacturing a porous membrane having a porous layer, the method comprising manufacturing a porous membrane precursor using a membrane-manufacturing stock solution containing a polymer (A), a polymer (B), and a polymer (C) having a unit based on vinyl pyrrolidone, and removing some of or the entire polymer (C) from the porous membrane precursor, in which the polymer (A) is a membrane-forming polymer, the polymer (B) is a polymer having a unit (b1) represented by formula (1) below:

[Chem. 3]

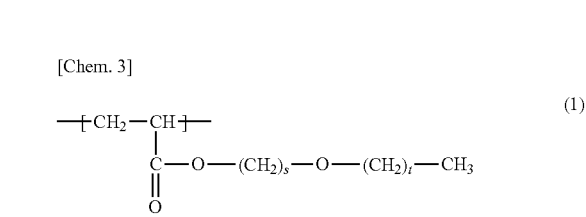

(1)

(in the formula, s is 2 or 3, and t is an integer of 0 to 2), and a unit (b2) based on hydroxyl group-containing (meth) acrylate, and the concentration (mass %) of the unit (b1) is equal to or higher than the concentration (mass %) of the unit (b2) in the membrane-manufacturing stock solution.

[10] The method for manufacturing a porous membrane described in [9], in which the polymer (B) further has a unit (b3) having a group represented by formula (2) below:

[Chem. 4]

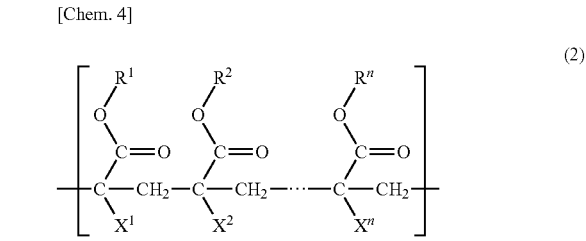

(2)

(in the formula, $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000).

[11] The method for manufacturing a porous membrane described in [9] or [10], in which the unit (b1) is a unit based on 2-methoxyethyl acrylate.

[12] A method for manufacturing a porous membrane which filtrates water to be treated to turn it into treated water, the porous membrane having a plurality of porous layers containing a polymer (A), the method comprising manufacturing a porous membrane precursor having a plurality of porous precursor layers each associated with a plurality of membrane-manufacturing stock solutions containing the polymer (A) and a polymer (C) which has a unit based on vinyl pyrrolidone using the plurality of membrane-manufacturing stock solutions, and removing some of or the entire polymer (C) from the porous membrane precursor, in which, among the plurality of membrane-manufacturing stock solutions, a membrane-manufacturing stock solution at least associated with an outermost layer of the porous membrane on a side of water to be treated further contains the polymer (B), and the mass of the polymer (B) among all polymers contained in the membrane-manufacturing stock solution associated with the outermost layer is greater than the mass of the polymer (B) among all polymers contained in a membrane-manufacturing stock solution associated with porous layers other than the outermost layer.

Advantageous Effects of Invention

The porous membrane according to an aspect of the present invention has high hydrophilicity and water permeability since the membrane contains a copolymer having a specific monomer unit, exhibits excellent anti-fouling properties in the membrane bioreactor method (MBR method), can be manufactured in uncomplicated steps, and is useful for a membrane module and a water treatment device equipped with the membrane module. Particularly, since the copolymer used in the porous membrane of the present invention is poorly soluble in water, it is less likely to be eluted in water. For this reason, there is an advantage that anti-fouling properties of the porous membrane in use in the MBR method are maintained for a long period of time.

In addition, the porous membrane according to another aspect of the present invention has high hydrophilicity and water permeability, exhibits excellent anti-fouling properties in the MBR method, and can be simply manufactured at low cost, and is useful for a membrane module and a water treatment device equipped with the membrane module.

According to a method for manufacturing a porous membrane of an aspect of the present invention, a porous membrane having high hydrophilicity and water permeability and exhibiting excellent anti-fouling properties in the MBR method can be manufactured in uncomplicated steps.

In addition, according to the method for manufacturing a porous membrane of another aspect of the present invention, a porous membrane having high hydrophilicity and water permeability and exhibiting excellent anti-fouling properties in the MBR method can be simply manufactured at low cost.

DESCRIPTION OF EMBODIMENTS

Figure 1:
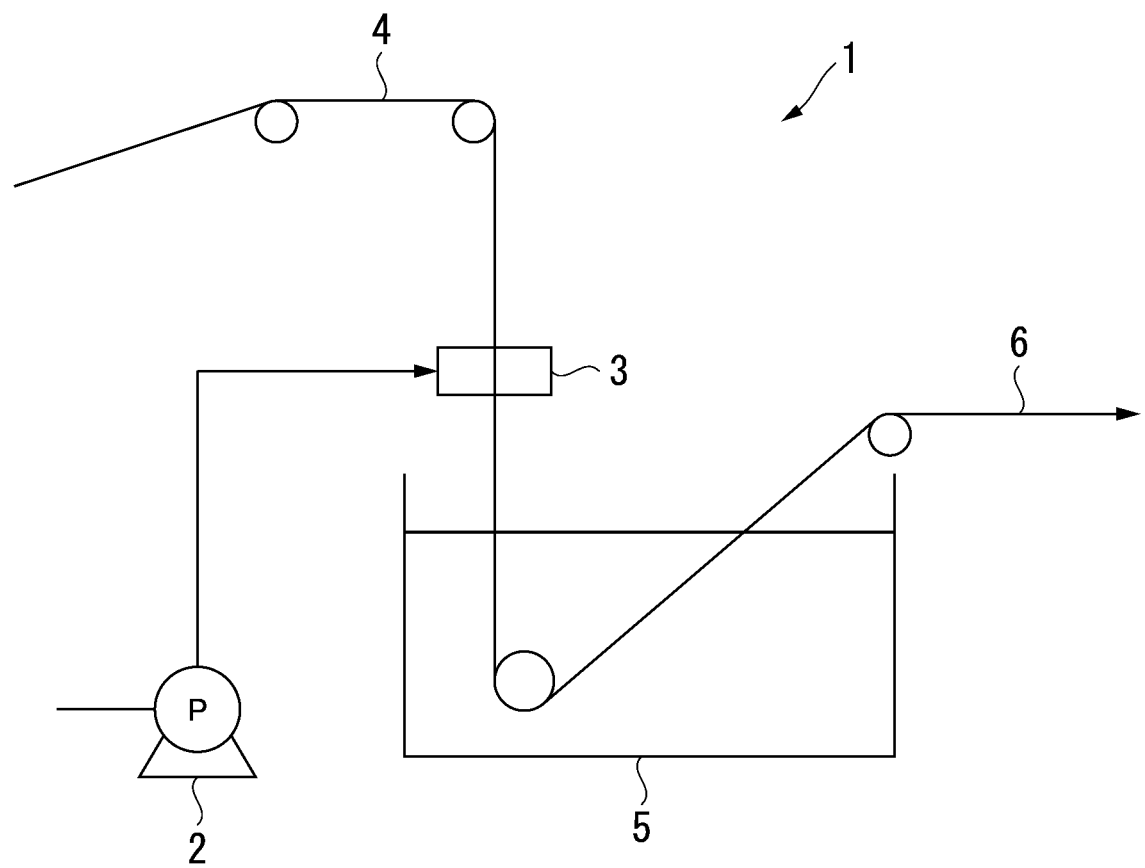
FIG. 1 is a schematic diagram illustrating an example of a device for manufacturing a porous membrane of the present invention.

The definitions of the following terms are applied throughout the present specification and the claims.

A "side of water to be treated" of a porous membrane refers to a side of the porous membrane having a membrane surface in contact with an unfiltered liquid.

"Hydrophobic" refers to a state in which a contact angle of a bulk of a membrane-forming polymer (A) with respect to pure water is 60° or greater.

A "contact angle of a bulk" refers to a contact angle of a smooth film, which is formed by dissolving a membrane-forming polymer (A) in a solvent (S), which will be described below, draining off the dissolved solution, and then evaporating the solvent (S), with respect to water droplets adhering to a surface of the film.

A "macromonomer" refers to a high molecular weight monomer having a polymerizable functional group and is also called a macromer.

A "terminal" of a macromonomer refers to an end of a main chain thereof when the longest part of a molecular chain of the macromonomer is the main chain.

A "terminal group" of a macromonomer refers to a group on the side opposite to a side of the macromonomer to which a group having an unsaturated double bond is added.

"(Meth)acrylate" is a generic term for acrylate and methacrylate, and "(meth) acrylic acid" is a generic term for acrylic acid and methacrylic acid.

"To" when indicating a numeric range indicates that the numeric values shown before and after "to" are included as a lower limit value and an upper limit value.

An embodiment of the present invention will be described in detail below.

A porous membrane of the present invention includes a polymer (A) that is a membrane-forming polymer (which will also be referred to as a "membrane-forming polymer (A)") and a polymer (B) having a unit (b1) represented by formula (1) and a unit (b2) based on hydroxyl group-containing (meth)acrylate.

[Chem. 5]

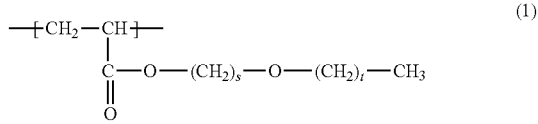

(1)

(In the formula, s is 2 or 3, and t is an integer of 0 to 2.)

In addition, the porous membrane of the present invention is characteristic in that a concentration (mass %) of the unit (b1) included in the porous membrane is equal to or higher than a concentration (mass %) of the unit (b2) included in the porous membrane.

Since a concentration (mass %) of the unit (b1) included in the porous membrane is equal to or higher than a concentration (mass %) of the unit (b2) included in the porous membrane, a structure of the porous membrane is uniform and mechanical properties (e.g., bubble point pressure) of the porous membrane are improved. A concentration (mass %) of the unit (b1) included in the porous membrane is preferably two times or more, more preferably three times or more, and even more preferably five times or more a concentration (mass %) of the unit (b2) included in the porous membrane.

<Membrane-Forming Polymer (A)>

The membrane-forming polymer (A) is one of components of the porous membrane.

The membrane-forming polymer (A) is for maintaining the structure of the porous membrane. A composition of the membrane-forming polymer (A) can be selected according to required characteristics of the porous membrane.

In a case in which the porous membrane is required to have chemical resistance, oxidation degradation resistance, and heat resistance, examples of the membrane-forming polymer (A) include, for example, a fluorine-containing polymer, polyvinyl chloride, polyethylene, polypropylene, polystyrene, a polystyrene derivative, polyamide, polyurethane, polycarbonate, polysulfone, polyethersulfone, and cellulose acetate. It is preferable for the membrane-forming polymer (A) to be hydrophobic in terms of difficulty in the porous membrane dissolving in pure water and easiness in maintaining the structure of the porous membrane. A fluorine-containing polymer is particularly preferable as the membrane-forming polymer (A) in terms of imparting chemical resistance and oxidation degradation resistance to the porous membrane.

"Hydrophobic" in the present invention refers to a state in which a contact angle of a bulk of the membrane-forming polymer (A) with respect to pure water is 60° or greater. A "contact angle of a bulk" refers to a contact angle of a smooth film, which is formed by dissolving a membrane-forming polymer (A) in a solvent (S), which will be described below, draining off the dissolved solution, and then evaporating the solvent (S), with respect to water droplets adhering to a surface of the film.

Examples of a fluorine-containing polymer include, for example, polyvinylidene fluoride, a vinylidene fluoride-hexafluoropropylene copolymer, an ethylene-chlorotrifluoroethylene copolymer, polyvinyl fluoride, and polytetrafluoroethylene. Polyvinylidene fluoride is preferable as a fluorine-containing polymer in terms of being able to impart oxidation degradation resistance and mechanical durability to the porous membrane.

One kind of membrane-forming polymer (A) may be used alone or two or more kinds thereof may be used in combination.

A polymer that can dissolve in the solvent (S), which will be described below, and hardly dissolves in pure water is preferable as the membrane-forming polymer (A). Polyvinylidene fluoride is particularly preferable as the membrane-forming polymer (A) in terms of solubility in the solvent (S) and good chemical resistance and heat resistance of the porous membrane.

A mass average molecular weight (Mw) of the membrane-forming polymer (A) is preferably 100,000 to 2,000,000 and more preferably 300,000 to 1,500,000.

If a mass average molecular weight of the membrane-forming polymer (A) is equal to or greater than the lower limit value, mechanical strength of the porous membrane tends to be good, and if a mass average molecular weight thereof is equal to or smaller than the upper limit value, solubility thereof in the solvent (S) tends to be good.

When a substance having a mass average molecular weight in this range is used as the membrane-forming polymer (A), it is possible to make a membrane-forming polymer (A) having a predetermined mass average molecular weight by mixing a substance having a different mass average molecular weight therewith.

A mass average molecular weight of the membrane-forming polymer (A) is obtained in gel permeation chromatography (GPC) using polystyrene or polymethyl methacrylate as a standard sample.

<Polymer (B)>

The polymer (B) is one of components of the porous membrane.

The polymer (B) has the unit (b1) represented by the above-described formula (1) and the unit (b2) based on hydroxyl group-containing (meth)acrylate.

The polymer (B) may have a unit (b3) having a group represented by formula (2).

[Chem. 6]

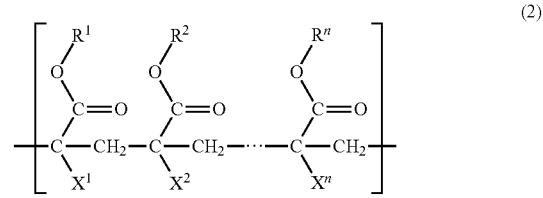

(In the formula, $R^1$ to $R^n$ each independently represent a hydrogen atom, an alkyl group, a cycloalkyl group, an aryl group or a heterocyclic group, $X^1$ to $X^n$ each independently represent a hydrogen atom or a methyl group, and n represents an integer of 3 to 10,000.)

The polymer (B) may have another unit (b4).

(Unit (b1))

The unit (b1) is a unit represented by formula (1) and is one of components of the polymer (B).

[Chem. 7]

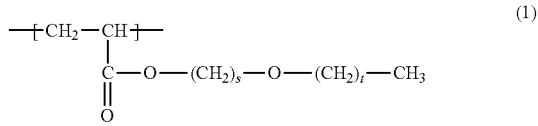

(In the formula, s is 2 or 3, and t is an integer of 0 to 2.)

Since the polymer (B) has the unit (b1), hydrophilicity, water permeability and anti-fouling properties can be imparted to the porous membrane.

A monomer unit based on 2-methoxyethyl acrylate is preferable as the unit (b1) in terms of imparting anti-fouling properties and hydrophilicity to the porous membrane.

Further, a reason that anti-fouling properties can be imparted to the porous membrane by the polymer (B) having the unit (b1) is thought to be as follows.

As water that hydrates a surface of a polymer, free water (water bound to a polymer with a weak force), intermediate water (water bound to a polymer with a medium force), and non-frozen water (water bound to a polymer with a strong force) are known. In a case in which the porous membrane is used in the membrane bioreactor method when intermediate water is present on a membrane surface thereof, it is difficult for protein and the like contained in activated sludge to adhere to the membrane surface, and thus, it is thought that anti-fouling properties will be able to be imparted.

To cause intermediate water to be present on a membrane surface, causing the porous membrane to contain a monomer unit in which an alkoxy group having a low number of carbon atoms is attached to a terminal of an alkyl ester of an acrylic acid having a low number of carbon atoms, that is, causing the porous membrane to contain the unit (b1) expressed by the formula (1), is thought to be effective, and among such monomers, a monomer unit based on 2-methoxyethyl acrylate is thought to be particularly effective.

(Unit (b2))

The unit (b2) is a unit based on hydroxyl group-containing (meth)acrylate and is one of the components of the polymer (B).

Hydrophilicity of the porous membrane increases due to the polymer (B) having the unit (b2).

Examples of the hydroxyl group-containing (meth)acrylate include 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, polypropylene glycol (meth)acrylate, and the like.

One kind of hydroxyl group-containing (meth)acrylate may be used alone, or two or more kinds thereof may be used in combination.

(Unit (b3))

The unit (b3) is a unit having a group expressed by formula (2) and can be one of the components of the polymer (B).

The polymer (B) can be fixed to the porous membrane and thus a porous membrane exhibiting excellent physical and chemical resistance can be obtained due to the polymer (B) having the unit (b3).

[Chem. 8]

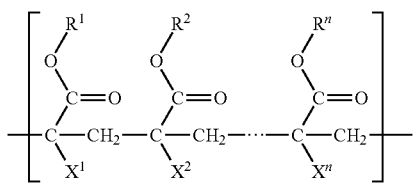

(2)

(In the formula, $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000.)

The dotted line in formula (2) represents a single bond or repetition of one or more (meth)acrylate ester units.

In formula (2), $R^1$ to $R^n$ each independently represent a hydrogen atom, an alkyl group, a cycloalkyl group, an aryl group, or a heterocyclic group. At least one hydrogen atom of the alkyl group, the cycloalkyl group, the aryl group, or the heterocyclic group may be substituted with a substituent which will be described below.

An example of the alkyl group includes a linear or branched alkyl group having 1 to 20 carbon atoms, and specific examples of the alkyl group include a methyl group, an ethyl group, an n-propyl group, an i-propyl group, and the like.

An example of the cycloalkyl group includes a cycloalkyl group having 3 to 20 carbon atoms, and specific examples thereof include a cyclopropyl group, a cyclobutyl group, an adamantyl group, and the like.

An example of the aryl group includes an aryl group having 6 to 18 carbon atoms, and specific examples thereof include a phenyl group, a naphthyl group, and the like.

An example of the heterocyclic group includes a heterocyclic group having 5 to 18 carbon atoms with a nitrogen atom, an oxygen atom, or a sulfur atom, and specific examples thereof include a γ-lactone group, a ε-caprolactone group, and the like.

Examples of the substituent in $R^1$ to $R^n$ include an alkyl group, an aryl group, a carboxy group, an alkoxycarbonyl group (—COOR'), a cyano group, a hydroxy group, an amino group, an amid group (—CONR'R"), a halogen atom, an allyl group, an epoxy group, an alkoxy group (—OR'), a group exhibiting hydrophilicity or ionicity, and the like. R' and R" each independently represent a hydrogen atom, an alkyl group, a cycloalkyl group, or an aryl group.

Examples of an alkoxycarbonyl group as a substituent include a methoxycarbonyl group and the like.

Examples of an amid group as a substituent include a dimethylamide group, and the like.

Examples of a halogen atom as a substituent include a fluorine atom, a chlorine atom, a bromine atom, an iodine atom, and the like.

An example of an alkoxy group as a substituent includes an alkoxy group having 1 to 12 carbon atoms, and specific examples thereof include a methoxy group, and the like.

Examples of the group exhibiting hydrophilicity or ionicity as a substituent include an alkaline salt of a carboxy group (—COOH), an alkaline salt of a sulfoxyl group (—SO$_3$H), a poly(alkylene oxide) group (a polyethylene oxide group, a polypropylene oxide group, or the like), a cationic substituent (a quaternary ammonium base, or the like), and the like.

At least one kind of $R^1$ to $R^n$ selected from a group consisting of an alkyl group and a cycloalkyl group is preferable, and an alkyl group is more preferable. A methyl group, an ethyl group, an n-propyl group, or an i-propyl group is preferable as an alkyl group, and a methyl group is more preferable in terms of availability of macromonomers, which will be described below.

In formula (2), $X^1$ to $X^n$ each independently represent a hydrogen atom or a methyl group, and a methyl group is preferable.

It is preferable for more than half of $X^1$ to $X^n$ to be methyl groups in terms of easy synthesis of macromonomers, which will be described below.

An example of a method for verifying whether more than half of $X^1$ to $X^n$ are methyl groups is an analysis method using known nuclear magnetic resonance spectra (NMR).

In formula (2), n is a natural number of 3 to 10,000. n is preferably a natural number of 10 to 10,000.

An example of the unit (b3) is, for example, a unit based on a macromonomer represented by formula (3).

[Chem. 9]

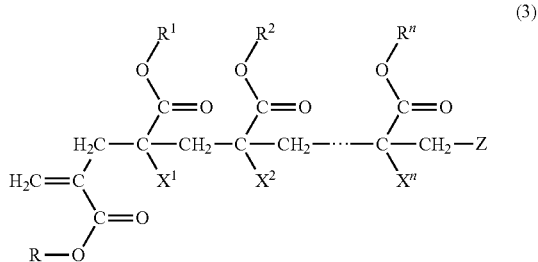

(3)

(In the formula, $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, n is an integer of 3 to 10,000, Rs each independently represent a hydrogen atom, an alkyl group, a cycloalkyl group, an aryl group, or a heterocyclic group, and Z is a terminal group of a macromonomer.)

The macromonomer has a radically polymerizable unsaturated double bond at one terminal of a poly(meth)acrylate segment. That is, the macromonomer has an unsaturated double bond at one terminal, which is radically polymerizable with 2-methoxyethyl acrylate, hydroxyl group-containing (meth)acrylate, or the like.

In formula (3), Rs each independently represent a hydrogen atom, an alkyl group, a cycloalkyl group, an aryl group, or a heterocyclic group. At least one hydrogen atom of the alkyl group, the cycloalkyl group, the aryl group, or the heterocyclic group may be substituted with the above-described substituents.

In formula (3), Z is a terminal group of the macromonomer. Examples of the terminal group include a hydrogen atom or a group derived from a radical polymerization initiator, like terminal groups of polymers obtained from known radical polymerizations.

Examples of a (meth)acrylate ester contained in the poly(meth)acrylate ester segment (skeleton) of the macromonomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth) acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth) acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonylphenoxyethyl (meth)acrylate, 3-methoxybutyl (meth)acrylate, PLACCEL FM (product name; manufactured by Daicel Corporation, unsaturated fatty acid hydroxyalkyl ester-modified ε-caprolactone), BLEMMER (registered trademark) PME-100 (product name, manufactured by NOF Corporation, methoxypolyethylene glycol methacrylate (having 2 chains of ethylene glycol)), BLEMMER (registered trademark) PME-200 (product name, manufactured by NOF Corporation, methoxypolyethylene glycol methacrylate (having 4 chains of ethylene glycol)), BLEMMER (registered trademark) PME-400 (product name, manufactured by NOF Corporation, methoxypolyethylene glycol methacrylate (having 9 chains of ethylene glycol)), BLEMMER (registered trademark) 50POEP-800B (product name, manufactured by NOF Corporation, octoxy polyethylene glycol-polypropylene glycol-methacrylate (having 8 chains of ethylene glycol and 6 chains of propylene glycol)), BLEMMER (registered trademark) 20ANEP-600 (product name, manufactured by NOF Corporation, nonylphenoxy(ethylene glycol-polypropylene glycol)monoacrylate), BLEMMER (registered trademark) AME-100 (product name, manufactured by NOF Corporation), BLEMMER (registered trademark) AME-200 (product name, manufactured by NOF Corporation), BLEMMER (registered trademark) 50AOEP-800B (product name, manufactured by NOF Corporation), and the like.

As a (meth)acrylate ester, a methacrylic acid ester is preferable, methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, 4-hydroxybutyl methacrylate, BLEMMER (registered trademark) PME-100, BLEMMER (registered trademark) PME-200 or BLEMMER (registered trademark) PME-400 is more preferable, methyl methacrylate, n-butyl methacrylate, 2-ethylhexyl methacrylate, 2-hydroxyethyl methacrylate, 4-hydroxybutyl methacrylate, BLEMMER (registered trademark) PME-100, BLEMMER (registered trademark) PME-200, or BLEMMER (registered trademark) PME-400 is even more preferable in terms of availability of monomers and mechanical properties of the polymer (B), and methyl methacrylate is particularly preferable in terms of good compatibility with PVDF when the membrane-forming polymer (A) is PVDF.

One kind of (meth)acrylate ester may be used alone, or two or more kinds thereof may be used in combination.

A number average molecular weight (Mn) of the macromonomer is preferably 1,000 to 1,000,000, more preferably 3,000 to 80,000, even more preferably 5,000 to 60,000, and particularly preferably 10,000 to 50,000 in terms of balance in the mechanical properties of the polymer (B).

A molecular weight distribution (Mw/Mn: mass average molecular weight/number average molecular weight) of the macromonomer is preferably 1.5 to 5.0 in terms of balance in the mechanical properties of the polymer (B).

A number average molecular weight and a molecular weight distribution of the macromonomer can be obtained through gel permeation chromatography using polymethyl methacrylate as a standard sample.

One kind of macromonomer may be used alone or two or more kinds thereof may be used in combination.

Examples of a method for manufacturing a macromonomer include a manufacturing method using a cobalt chain transfer agent (e.g., U.S. Pat. No. 4,680,352), a method using an α-substituted unsaturated compound such as α-bromomethylstyrene as a chain transfer agent (e.g., WO 88/04304), a method of chemically bonding a polymerizable group (e.g., JP S60-133007, and U.S. Pat. No. 5,147,952), a method using pyrolysis (e.g., JP H11-240854), and the like. As a method for manufacturing the macromonomer, the manufacturing method using a cobalt chain transfer agent is preferable in terms of efficient manufacturing of the macromonomer.

Examples of a method for polymerizing a (meth)acrylate ester when manufacturing the macromonomer include a bulk polymerization method, a solution polymerization method, an aqueous dispersion polymerization method (a suspension polymerization method, an emulsion polymerization method, or the like), and the like. The solution polymerization method and the aqueous dispersion polymerization method (the suspension polymerization method, the emulsion polymerization method, and the like) are preferable as a polymerization method in terms of simplification of a recovery process of the macromonomer.

Examples of a solvent used in the solution polymerization method include a hydrocarbon (toluene, or the like), an ether (diethyl ether, tetrahydrofuran, or the like), a halogenated hydrocarbon (dichloromethane, chloroform, or the like), a ketone (acetone, or the like), an alcohol (methanol, or the like), a nitrile (acetonitrile, or the like), an ester (ethyl acetate, or the like), a carbonate (ethylene carbonate, or the like), supercritical carbon dioxide, and the like.

One kind of solvent may be used alone or two or more kinds thereof may be used in combination.

A method including a step of causing a solvent, a (meth)acrylate ester, a polymerization initiator, and a chain transfer agent to react with each other at a temperature of 25 to 200°

C. for 0.5 to 24 hours is preferable as a method for manufacturing the macromonomer.

(Other Unit (b4))

The other unit (b4) is a unit based on a monomer other than the monomer constituting the unit (b1) (2-methoxyethyl acrylate, or the like), the hydroxyl group-containing (meth) acrylate constituting the unit (b2), and the macromonomer constituting the unit (b3).

The other unit (b4) can be one of the components of the polymer (B).

The other unit (b4) is not particularly limited as long as it is copolymerizable with 2-methoxyethyl acrylate, a hydroxyl group-containing (meth)acrylate, a macromonomer, and the like. For the monomer constituting the other unit (b4), ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, nonyl (meth)acrylate, decyl (meth)acrylate, undecyl (meth)acrylate, lauryl (meth)acrylate, tridecyl (meth)acrylate, tetradecyl (meth)acrylate, pentadecyl (meth)acrylate, phenyl (meth)acrylate, benzyl (meth)acrylate, glycidyl (meth)acrylate, 2-ethylhexyl (meth)acrylate, PLACCEL FM (product name; manufactured by Daicel Corporation, a monomer to which caprolactone is added), methoxyethyl methacrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonylphenoxyethyl (meth)acrylate, 3-methoxybutyl (meth)acrylate, BLEMMER (registered trademark) PME-100 (product name, manufactured by NOF Corporation, methoxypolyethylene glycol methacrylate (having 2 chains of ethylene glycol)), BLEMMER (registered trademark) PME-200 (product name, manufactured by NOF Corporation, methoxypolyethylene glycol methacrylate (having 4 chains of ethylene glycol)), 2-methacryloyloxyethyl phosphoryl choline, dimethylaminoethyl methacrylate, dimethylaminoethyl methacrylate methylchloride salt, dimethylaminoethyl methyl sulfate methacrylate, 3-(methacrylamide)propyltrimethylammonium chloride, 3-(methacrylamide)propyltrimethylammonium methyl sulfate, a dimethylaminoethyl methacrylate quaternary salt, and the like are preferable in terms of controlling solubility of the polymer (B) in the solvent (S).

One kind of other monomer (b4) may be used alone or two or more kinds thereof may be used in combination.

(Concentration of Each Unit in Polymer (B))

Among all units constituting the polymer (B) (100 mass %), a concentration of the unit (b1) is preferably 20 to 95 mass %, more preferably 30 to 90 mass %, and even more preferably 40 to 85 mass %.

If a concentration of the unit (b1) is equal to or higher than the lower limit value, hydrophilicity, water permeability, and anti-fouling properties can be sufficiently imparted to the porous membrane, and there is little concern about elution in a use environment since the polymer (B) is substantially water-insoluble. In addition, if a concentration of the unit (b1) is equal to or lower than the upper limit value, effects brought by units other than the unit (b1) including the unit (b2) can be sufficiently exhibited.

Among all the units constituting the polymer (B) (100 mass %), a concentration of the unit (b2) is preferably 0.1 to 40 mass %, more preferably 0.5 to 38 mass %, and even more preferably 0.8 to 35 mass %.

If a concentration of the unit (b2) is equal to or higher than the lower limit value, hydrophilicity of the porous membrane is even higher. If a concentration of the unit (b2) is equal to or lower than the upper limit value, the polymer (B) hardly dissolves in water, and thus hydrophilicity of the porous membrane can be easily maintained. In addition, compatibility with a polymer (C), which will be described below, tends to increase as well.

A concentration (mass %) of the unit (b1) included in the polymer (B) is equal to or higher than a concentration (mass %) of the unit (b2) included in the polymer (B). A concentration (mass %) of the unit (b1) included in the polymer (B) is preferably two times or more, more preferably three times or more, and even more preferably five times or more a concentration (mass %) of the unit (b2) included in the polymer (B).

When the polymer (B) has the unit (b3), a concentration of the unit (b3) among all the units constituting the polymer (B) (100 mass %) is preferably 1 to 60 mass %, more preferably 5 to 50 mass %, and even more preferably 10 to 45 mass %.

If a concentration of the unit (b3) is equal to or higher than the lower limit value, flexibility of the porous membrane is good. If a concentration of the unit (b3) is equal to or lower than the upper limit value, anti-fouling properties of the porous membrane tend not to be impaired.

When the polymer (B) has the other unit (b4), a concentration of the other unit (b4) among all the units constituting the polymer (B) (100 mass %) is preferably 1 to 50 mass %, and more preferably 4.2 to 40 mass %.

If a concentration of the other unit (b4) is equal to or higher than the lower limit value, flexibility of the porous membrane is good. If a concentration of the other unit (b4) is equal to or lower than the upper limit value, anti-fouling properties of the porous membrane tend not to be impaired.

(Physical Properties of Polymer (B))

A number average molecular weight of the polymer (B) is preferably 1,000 to 5,000,000, preferably 2,000 to 500,000, and more preferably 5,000 to 300,000. If a number average molecular weight of the polymer (B) is in this range, thermal stability of the polymer (B) and mechanical strength and hydrophilicity of an outer surface of the obtained porous membrane tend to increase.

A number average molecular weight of the polymer (B) can be obtained through gel permeation chromatography using polystyrene as a standard sample.

One kind of the polymer (B) may be used alone, or two or more kinds of polymer having different concentrations of respective units, molecular weight distributions, or molecular weights may be used in combination.

The polymer (B) may be a random copolymer, a block copolymer, or a graft copolymer.

When a random copolymer is synthesized, a method of using known free radical polymerization is convenient.

When a block copolymer and a graft copolymer are synthesized, a method of using known controlled radical polymerizations is convenient.

(Method for Manufacturing Polymer (B))

An example of a method for polymerizing monomer components when the polymer (B) is manufactured is the solution polymerization method.

A solvent (S) used in the solution polymerization method is not particularly limited as long as the polymer (B) is soluble.

When a polymerization solution (D) after polymerization is used as a membrane-manufacturing stock solution as it is, a substance that can dissolve the membrane-forming polymer (A) is preferable as a solvent (S). Examples of a solvent (S) include acetone, N,N-dimethylformamide (DMF), N,N-dimethylacetamide (DMAc), dimethylsulfoxide (DMSO), N-methylpyrrolidone (NMP), hexamethylphosphoric acid triamide, tetramethylurea, triethyl phosphate, trimethyl phosphate, and the like. Acetone, DMF, DMAc, DMSO, and NMP are preferable as a solvent (S) in terms of easy handling and excellent solubility of the membrane-forming polymer (A) and the polymer (B).

One kind of the solvent (S) may be used alone or two or more kinds thereof may be used in combination.

When monomer components are polymerized, a chain transfer agent or a radical polymerization initiator may be used.

A chain transfer agent adjusts a molecular weight of the polymer (B). Examples of the chain transfer agent include mercaptan, hydrogen, α-methylstyrene dimer, terpenoid, and the like.

One kind of the chain transfer agent may be used alone or two or more kinds thereof may be used in combination.

Examples of a radical polymerization initiator include an organic peroxide, an azo compound, and the like.

Examples of an organic peroxide include 2,4-dichlorobenzoyl peroxide, t-butylperoxypivalate, o-methylbenzoyl peroxide, bis-3,5,5-trimethylhexanoyl peroxide, octanoyl peroxide, t-butylperoxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, di-t-butyl peroxide, and the like.

Examples of an azo compound include 2,2'-azobisisobutyronitrile (AIBN), 2,2'-azobis (2,4-dimethylvaleronitrile), 2,2'-azobis (2,4-dimethyl-4-methoxy valeronitrile), and the like.

Benzoyl peroxide, AIBN, 2,2'-azobis(2,4-dimethylvaleronitrile), and 2,2'-azobis (2,4-dimethyl-4-methoxy valeronitrile) are preferable as the radical polymerization initiator in terms of availability and having a half-life temperature suitable for polymerization conditions.

One kind of radical polymerization initiator may be used alone or two or more kinds thereof may be used in combination.

An addition amount of the radical polymerization initiator is preferably 0.0001 to 10 parts by mass with respect to 100 parts by mass of the monomer components.

A polymerization temperature when the monomer components are polymerized, −100 to 250° C. are preferable, and 0 to 200° C. are more preferable, taking a boiling point of the solvent (S) or a use temperature range of the radical polymerization initiator into consideration.

The polymerization solution (D) after polymerization can be used as a membrane-manufacturing stock solution as it is when the polymer (B) is manufactured using the solution polymerization method.

<Polymer (C) Having Unit Based on Vinyl Pyrrolidone>

The polymer (C) having a unit based on vinyl pyrrolidone (which will also be referred to as "the polymer (C)" below) can be one of components of the membrane-manufacturing stock solution.

The polymer (C) is added as an aperture auxiliary for controlling phase separation of the membrane-forming polymer (A) and the solvent (S).

Examples of the polymer (C) include polyvinylpyrrolidone and a copolymer having a unit based on vinyl pyrrolidone and other units (the unit (b2), the unit (b4), and the like).

One kind of the polymer (C) may be used alone or two or more kinds thereof may be used in combination.

A polymer having a molecular weight distribution in which a peak area value of a mass average molecular weight of $1 \times 10^6$ or more with respect to a total area value of a peak area of chromatogram obtained in GPC measured using an RI detector is 10% or less is preferable as the polymer (C) in terms of physical properties and the like of the porous membrane.

By using the polymer (C) having the molecular weight distribution, good cleanability (removability) as a phase separation control agent may be exhibited, fine cracks may be easily generated in the structure of the porous membrane, and thus the porous membrane tends to have good filtration performance.

As a lower limit value of a content of a macromolecular polymer of the polymer (C) having a mass average molecular weight of $1 \times 10^6$ or more, 5 mass % is preferable, 8 mass % is more preferable, and 10 mass % is even more preferable in terms of easy removal of the polymer (C) from a porous membrane precursor, which will be described below and the fact that the polymer (C) remains in the porous membrane, thus the porous membrane swells in water which makes it difficult to block the pores, and thus the porous membrane has good water permeability. As an upper limit value of a content of a macromolecular polymer of the polymer (C) having a mass average molecular weight of $1 \times 10^6$ or more, 25 mass % is preferable and 20 mass % is more preferable. By setting a content of a macromolecular polymer having a mass average molecular weight of $1 \times 10^6$ or more to the lower limit value % or more, the porous membrane tends to have good filtration characteristics particularly when it is used as a sewer water filtration membrane.

<Concentration and State of Each Polymer in Porous Membrane>

A concentration of the membrane-forming polymer (A) in the porous membrane (100 mass %) is preferably 60 to 99.9 mass %, more preferably 70 to 98 mass %, and even more preferably 80 to 97 mass %.

If a concentration of the membrane-forming polymer (A) is equal to or higher than the lower limit value, mechanical properties tend to be imparted to the porous membrane, and if a concentration thereof is equal to or lower than the upper limit value, a contact angle with respect to pure water on a surface of the membrane tends to be lowered.

A concentration of the polymer (B) in the porous membrane (100 mass %) is preferably 0.1 to 20 mass %, more preferably 1 to 15 mass %, and even more preferably 3 to 10 mass %.

If a concentration of the polymer (B) is equal to or higher than the lower limit value, anti-fouling properties and hydrophilicity tend to be imparted to the membrane, and if a concentration thereof is equal to or lower than the upper limit value, the porous membrane can maintain mechanical properties.

A concentration of the polymer (B) with respect to a total (100 mass %) of the membrane-forming polymer (A) and the polymer (B) contained in the porous membrane is preferably 0.1 to 20 mass %, more preferably 1 to 18 mass %, and even more preferably 4 to 15 mass %. If a concentration of the polymer (B) with respect to a total of the membrane-forming polymer (A) and the polymer (B) contained in the porous membrane is equal to or higher than the lower limit value, anti-fouling properties can be easily imparted to the surface of the porous membrane, and if a concentration thereof is equal to or lower than the upper limit value, the polymer (B) is less likely to block the inside of the membrane and water can flow therein, and thus a porous membrane having a pure water permeation flux of 5 (m$^3$/m$^2$/MPa/h) or more is easily obtained.

A concentration of the unit (b1) in the porous membrane (100 mass %) is preferably 0.02 to 19 mass %, more preferably 0.3 to 13.5 mass %, and even more preferably 1.2 to 8.5 mass %.

If a concentration of the unit (b1) is equal to or higher than the lower limit value, hydrophilicity, water permeability, and anti-fouling properties can be sufficiently imparted to the porous membrane, the polymer (B) becomes substantially insoluble, and thus there is little concern of elution in a use environment. In addition, if a concentration of the unit (b1) is equal to or lower than the upper limit value, effects brought by units other than the unit (b1) including the unit (b2) can be sufficiently exhibited.

A concentration of the unit (b2) in the porous membrane (100 mass %) is preferably 0.0001 to 8 mass %, more preferably 0.005 to 5.7 mass %, and even more preferably 0.024 to 3.5 mass %.

If a concentration of the unit (b2) is equal to or higher than the lower limit value, hydrophilicity of the porous membrane is even higher. If a concentration of the unit (b2) is equal to or lower than the upper limit value, the polymer (B) less dissolves in water, and thus hydrophilicity of the porous membrane can be easily maintained. In addition, compatibility with the polymer (C), which will be described below, also tends to increase.

When the porous membrane has the unit (b3), a concentration of the unit (b3) in the porous membrane (100 mass %) is preferably 0.001 to 12 mass %, more preferably 0.05 to 7.5 mass %, and even more preferably 0.3 to 4.5 mass %.

If a concentration of the unit (b3) is equal to or higher than the lower limit value, flexibility of the porous membrane is good. If a concentration of the unit (b3) is equal to or lower than the upper limit value, anti-fouling properties of the porous membrane tend not to be impaired.

A concentration of each of the units in the porous membrane (100 mass %) can be measured in a method described in [a composition of the porous membrane (hollow fiber membranes M-A1 to M-A7, M'-A1 to M'-A5, and M'-B1)] in Examples. Further, when inconvenient incidents described in (i) to (iv) below occur during measurement, countermeasures can be taken as described in (i) to (iv).

(i) When a support does not come off from a hollow fiber membrane, the hollow fiber membrane is immersed in a deuterated solvent as it is, the porous membrane other than the support dissolves therein, and the support is removed and set as a sample.

(ii) When a support does not come off from the hollow fiber membrane and both the porous membrane layer and support dissolve in a deuterated solvent, the hollow fiber membrane is immersed in a solvent in which the support does not dissolve, only the porous membrane layer dissolves therein, and the support is removed. Then, the solvent of the porous membrane layer is evaporated, and the remaining porous membrane layer is set as a sample.

(iii) When the peaks overlap in an $^1$H-NMR spectrum, the peaks can be caused not to overlap by measuring a two-dimensional $^1$H-NMR spectrum, or the like.

(iv) When it is unclear what polymer is contained in the porous membrane, pyrolysis gas chromatography, gel permeation chromatography, infrared absorption spectrum, or the like can be used in addition to the $^1$H-NMR spectrum in combination, and after the polymer contained in the porous membrane is identified, a concentration (mol %) and a concentration (mass %) of each unit can be measured using the $^1$H-NMR spectrum.

The porous membrane of the present invention can include the above-described polymer (C) in addition to the membrane-forming polymer (A) and the polymer (B) as long as the effects of the present invention are not impaired. The polymer (C) is usually added to the membrane-manufacturing stock solution in manufacturing of the porous membrane, but is removed in a cleaning step of the porous membrane precursor, however, it is not completely removed in the cleaning step and may remain in the porous membrane.

When the porous membrane includes the polymer (C), a concentration of the polymer (C) in the porous membrane (100 mass %) is preferably 0.1 to 15 mass %, more preferably 0.3 to 12 mass %, and even more preferably 0.5 to 10 mass %.

If a concentration of the polymer (C) is equal to or higher than the lower limit value, anti-fouling properties and water permeability of the porous membrane tend not to be impaired, and if a concentration thereof is equal to or lower than the upper limit value, blockage of the pores by the polymer (C) less occurs. In addition, since the polymer (C) dissolves in water, the fear of impairing water quality due to the polymer (C) melt out in treated water can be reduced by setting a concentration of the polymer (C) to be equal to or lower than the upper limit value.

The membrane-forming polymer (A) and the polymer (B) in the porous membrane may or may not be compatible, or only parts thereof may be compatible.

The polymer (B) may be present on at least a surface of the membrane-forming polymer (A), that is, a surface of the porous membrane. If the polymer (B) is present on a surface of the porous membrane, anti-fouling properties and hydrophilicity can be imparted to the porous membrane.

In the present specification, a surface of the porous membrane means a surface of all pores of the porous membrane, and does not mean an outside/inside, an outer side, or an inner side of a shape of the porous membrane.

When the porous membrane includes the polymer (C), the polymer (C) contained in the porous membrane may or may not be compatible with the membrane-forming polymer (A) and the polymer (B), or only parts thereof may be compatible.

Although most of the polymer (C) is removed in the process of manufacturing the porous membrane, it is likely to be covered by the membrane-forming polymer (A) and/or the polymer (B) and present in a state in which it is not eliminated in a cleaning step, which will be described below, in the process of phase separation. Even if the polymer (C) is present in such a state in the porous membrane, the effects of the present invention are not affected thereby.

<Additive>

The porous membrane of the present invention may include various additives within a scope not departing from the present objective.

Examples of additives include fibrous materials such as cellulose nanofibers, glass fibers, carbon fibers, and acrylic fibers; resin powders such as polyvinyl acetate, cellulose derivatives, and acrylic resins: inorganic particles such as silica particles, titanium oxide particles, and active charcoal; surfactants such as polyvinyl alcohol, polyethylene glycol, polypropylene glycol, glycerin, and the like.

<Structure of Porous Membrane>

The porous membrane of the present invention is for filtering water to be treated to turn it into treated water and may be a porous membrane having a plurality of porous layers including the membrane-forming polymer (A).

In this case, among the plurality of porous layers constituting the porous membrane, at least an outermost layer (a) of the porous membrane on the side of the water to be treated further contains the polymer (B) besides the membrane-forming polymer (A), and a mass of the polymer (B) among all polymers contained in the outermost layer (α) is greater than a mass of the polymer (B) among all polymers contained in the porous layers other than the outermost layer.

The outermost layer (α) may further contains the polymer (C) besides the membrane-forming polymer (A).

(Outermost Layer (α))

A mass $α_B$ of the polymer (B) among all the polymers contained in the outermost layer (α) is greater than a mass $β_B$ of the polymer (B) among all the polymers contained in the porous layers (β) other than the outermost layer (α). That the mass $α_B$ is greater than the mass $β_B$ means that, if the outermost layer (α) is set to include the polymer (B) in a sufficient amount for exhibiting hydrophilicity, water permeability, and anti-fouling properties, an amount of the polymer (B) to be contained in other porous layers (β) can be reduced or set to 0. For this reason, a use amount of the expensive polymer (B) can be reduced more and thus the porous membrane can be manufactured at a lower cost in comparison to a case in which the polymer (B) is uniformly contained in the entire porous membrane.

The mass $α_B$ is preferably 1.2 times or more preferably two times or more of the mass $β_B$. Most preferably, the mass $β_B$ is 0.

A percentage of the membrane-forming polymer (A) in the outermost layer (α) is preferably 60 to 99.9 mass %, more preferably 70 to 99 mass %, and even more preferably 80 to 95 mass % with respect to the outermost layer (α).

A percentage of the polymer (B) in the outermost layer (α) is preferably 0.1 to 40 mass %, more preferably 1 to 30 mass %, and even more preferably 5 to 20 mass % with respect to the outermost layer (α).

If a percentage of the polymer (B) is equal to or higher than the lower limit value, hydrophilicity, water permeability, and anti-fouling properties can be sufficiently imparted to the porous membrane. If a percentage of the polymer (B) is equal to or lower than the upper limit value, the polymer (B) is less likely to block the inside of the porous membrane and water can flow therein, and thus a porous membrane having a pure water permeation flux of 5 $m^3/m^2/MPa/h$ or more tends to be easily obtained.

When the outermost layer (α) includes the polymer (C), a percentage of the polymer (C) in the outermost layer (α) is preferably 0 to 15 mass %, more preferably 0 to 12 mass %, and even more preferably 0 to 10 mass % with respect to the outermost layer (α).

(Another Porous Layer (β))

Among the plurality of porous layers constituting the porous membrane, another porous layer (β) other than the outermost layer (α) may further contain the polymer (B) besides the membrane-forming polymer (A).

The other porous layer (β) may further contain the polymer (C) besides the membrane-forming polymer (A).

A percentage of the membrane-forming polymer (A) in the other porous layer (β) is preferably 60 to 100 mass %, more preferably 70 to 100 mass %, and even more preferably 80 to 100 mass % with respect to the other porous layer (β). When the other porous layer (β) includes the polymer (B), a percentage of the polymer (B) in the other porous layer (β) is preferably 0 to 40 mass %, more preferably 0 to 30 mass %, and even more preferably 0 to 20 mass % with respect to the other porous layer (β).

When the other porous layer (β) includes the polymer (C), a percentage of the polymer (C) in the other porous layer (β) is preferably 0 to 15 mass %, more preferably 0 to 12 mass %, and even more preferably 0 to 10 mass % with respect to the other porous layer (β)

(Average Pore Diameter of Pores of Porous Layer)

An average pore diameter of pores of the porous layer is preferably 1 to 1200 nm in terms of removal of bacteria and virus, purification of proteins and enzymes, or availability of clean water supply. If an average pore diameter of pores is 1 nm or greater, high water permeation pressure tends not to be needed when water is treated, and if an average pore diameter of pores is 1200 nm or smaller, bacteria, virus, suspended substances contained in clean water supply, and the like tend to be easily removed.

An average pore diameter of the pores of the porous layer is preferably 500 nm or smaller, more preferably 400 nm or smaller, and particularly preferably 350 nm or smaller.

An average pore diameter of the pores of the porous layer is a value obtained by photographing a cross-section of the porous membrane using a scanning-type electronic microscope and performing an image analysis process thereon. For example, an outer surface portion of the porous membrane is observed using a scanning-type electronic microscope, 30 pores are selected at random, the longest diameter of every pore is measured, and then the longest diameter of the 30 pores are averaged.

(Form of Porous Membrane)

Examples of form of the porous membrane include a hollow fiber membrane, a flat membrane, and the like, and the hollow fiber membrane is preferable in terms of being able to be easily processed in an arbitrary length, and being able to fill a membrane module with the membranes at a high filling rate. The porous membrane may have a macrovoid or a spherulite structure in the membrane.

(Support)

The porous membrane of the present invention may have a support. By having a support, the plurality of porous layers are reinforced by the support, and physical properties such as burst pressure and tensile strength can be improved.

Examples of the support include a woven fabric, a non-woven fabric, a braid, a knitted string, a net, and the like. Examples of materials for the support include synthetic fibers, semi-synthetic fibers, regenerated fibers, natural fibers, and the like.

Examples of synthetic fibers include polyamide-based fibers such as nylon 6, nylon 66, and aromatic polyamide; polyester-based fibers such as polyethylene terephthalate, polybutylene terephthalate, polylactic acid, and polyglycolic acid; acryl-based fibers such as polyacrylonitrile; polyolefin-based fibers such as polyethylene and polypropylene; polyvinyl alcohol-based fibers; polyvinylidene chloride-based fibers; polyvinyl chloride-based fibers; polyurethane-based fibers; phenolic resin-based fibers; fluorine-based fibers such as polyvinylidene fluoride and polytetrafluoroethylene; polyalkylene paraoxybenzoate-based fibers, and the like.

Examples of semi-synthetic fibers include cellulose derivative-based fibers using cellulose diacetate, cellulose triacetate, chitin, chitosan and the like as raw materials: protein-based fibers called ProMix, and the like.

Examples of the regenerated fibers include cellulose-based regenerated fibers (rayon, cupra, polynosic, and the like) obtained by a viscose method, a copper-ammonia method, an organic solvent method, and the like.

Examples of natural fibers include flax and jute.

(Hollow Fiber Membrane)

In addition, when a form of the porous membrane is a hollow fiber membrane, a hollow braid or knitted string can be used as a support as it is. By providing the porous layer on an inner surface or an outer surface of a string, it becomes a reinforced hollow fiber membrane.

When the porous membrane is a hollow fiber membrane, an outer diameter of the hollow fiber membrane is preferably 20 to 3,000 more preferably 30 to 2,800 and even more preferably 40 to 2,700 μm.

If an outer diameter of the hollow fiber membrane is equal to or higher than the lower limit value, thread breaking tends to hardly occur at the time of manufacturing the membrane. If an outer diameter of the hollow fiber membrane is equal to or lower than the upper limit value, the hollow shape tends to be easily maintained and be difficult to flatten especially even if external pressure is applied.

When the porous membrane is a hollow fiber membrane, a thickness of the hollow fiber membrane (however, it means a thickness excluding a support when the membrane includes the support) is preferably 5 to 250 μm, more preferably 30 to 200 μm, and even more preferably 50 to 180 μm.

If a thickness of the hollow fiber membrane is equal to or higher than the lower limit value, thread breaking tends to hardly occur at the time of manufacturing the membrane. If a thickness of the hollow fiber membrane is equal to or lower than the upper limit value, the membrane tends to have high water permeability.

(Physical Properties of Porous Membrane)

The porous membrane of the present invention includes the membrane-forming polymer (A) and the polymer (B) as described above.

Since the porous membrane includes the polymer (B), the outer surface of the porous membrane becomes hydrophilic, and thus a difference in water permeability between a dry state and a wet state can be reduced.

Hydrophilicity of the porous membrane of the present invention uses a value of a degree of hydrophilization (HP; no unit exists) calculated using the following formula (2) as an index.

$$(W_{d20}/W_{w100}) \qquad (2)$$

$W_{d20}$: WF at a measured pressure of 20 kPa when the porous membrane is in a dry state.

$W_{w100}$: WF at a measured pressure of 100 kPa when the porous membrane is in a wet state with water.

Since the porous membrane of the present invention has high hydrophilicity, a value of the HP can be 0.5 to 1.3.

A pure water permeation flux (Water Flux) of the porous membrane of the present invention can have a high pure water permeation flux in the range of 5 $m^3/m^2/MPa/h$ or more and less than 200 $m^3/m^2/MPa/h$ since the membrane is manufactured using the polymer (C).

If a pure water permeation flux is equal to or higher than the lower limit value, a large amount water can be treated within a certain time, and thus it is preferably applied to a water treatment membrane. If a pure water permeation flux is less than the upper limit value, defects included in the porous membrane can be reduced, and thus the membrane can widely be used in fields such as clean water supply, water drainage, and the like.

[Polymer Composition]

The porous membrane of the present invention may be manufactured using a polymer composition including the above-described membrane-forming polymer (A), the polymer (B), and the polymer (C). The polymer composition can be used in a method for manufacturing a porous membrane, which will be described below, by mixing it with a solvent that can dissolve the above-described membrane-forming polymer (A) to make it a membrane-manufacturing stock solution.

Preferred modes of the membrane-forming polymer (A), the polymer (B), and the polymer (C) are as described above.

A concentration of the membrane-forming polymer (A) in the polymer composition (100 mass %) is preferably 20 to 90 mass %, more preferably 20 to 80 mass %, even more preferably 30 to 70 mass %, and particularly preferably 40 to 60 mass %.

If a concentration of the membrane-forming polymer (A) is equal to or higher than the lower limit value, the porous membrane tends to be easily obtained, and if a concentration thereof is equal to or lower than the upper limit value, a contact angle of a membrane surface with respect to pure water tends to be low.

A concentration of the polymer (B) in the polymer composition (100 mass %) is preferably 0.1 to 20 mass %, more preferably 1 to 15 mass %, and even more preferably 3 to 10 mass %.

If a concentration of the polymer (B) is equal to or higher than the lower limit value, anti-fouling properties and hydrophilicity tend to be imparted to the membrane, and if a concentration thereof is equal to or lower than the upper limit value, the porous membrane can be easily obtained.

A concentration of the polymer (C) in the polymer composition (100 mass %) is preferably 5 to 50 mass %, more preferably 10 to 45 mass %, and even more preferably 20 to 40 mass %.

If a concentration of the polymer (C) is equal to or higher than the lower limit value, the porous membrane can be easily formed, and if a concentration thereof is equal to or lower than the upper limit value, the porous membrane tends to have high mechanical strength.

[Method for Manufacturing Porous Membrane]

An example of a method for manufacturing the porous membrane of the present invention will be described below.

The membrane-forming polymer (A), the polymer (B), and the polymer (C) are mixed with the solvent (S) to prepare a membrane-manufacturing stock solution (a porous membrane preparation liquid) (a preparation step).

The obtained membrane-manufacturing stock solution is immersed in a coagulation solution and coagulated, and thereby a porous membrane precursor is obtained (a coagulation process).

Solvent (S) remaining in the obtained porous membrane precursor and some of or the entire polymer (C) is washed and removed (a washing step).

The washed porous membrane precursor is dried and thereby a porous membrane is obtained (a drying step).

(Preparation Step)

The membrane-manufacturing stock solution is obtained by mixing the membrane-forming polymer (A), the polymer (B), and the polymer (C) with the solvent (S). When the membrane-manufacturing stock solution includes the membrane-forming polymer (A), the polymer (B), the polymer (C), and an additive, it is preferably to dissolve some of the additive in the solvent (S), but the additive may not necessarily dissolve as long as it is uniformed dispersed therein.

When the polymer (B) is manufactured using the solvent (S) in a solution polymerization method, the membrane-forming polymer (A) and the polymer (C) may be directly added to and dissolve in the polymerization solution (D) after the polymerization in which the polymer (B) has been manufactured. In this case, the solvent (S) may be further added and diluted so that the polymerization solution (D) or the membrane-manufacturing stock solution has a desired concentration.

When an additive is added to the membrane-manufacturing stock solution, the additive may be directly input into the solvent (S), may be added in a state in which the additive dissolves in the solvent (S), may be compounded with the membrane-forming polymer (A), the polymer (B), and the polymer (C) in advance, or may be directly input into the polymerization solution (D) or the membrane-manufacturing stock solution.

In addition, when the membrane-manufacturing stock solution is prepared and the solvent (S) has a temperature equal to or lower than a boiling point thereof, the membrane-forming polymer (A), the polymer (B), and the polymer (C) may dissolve in the solvent (S) while heating it, and the solvent (S) may be cooled if necessary.

A concentration of the membrane-forming polymer (A) in the membrane-manufacturing stock solution (100 mass %) is preferably 5 to 40 mass %, more preferably 8 to 30 mass %, even more preferably 10 to 25 mass %, and particularly preferably 10 to 20 mass %.

If a concentration of the membrane-forming polymer (A) is equal to or higher than the lower limit value, a porous membrane tends to be easily obtained, and if a concentration thereof is equal to or lower than the upper limit value, the membrane-forming polymer (A) tends to easily dissolve in the solvent (S).

A concentration of the polymer (B) in the membrane-manufacturing stock solution (100 mass %) is preferably 0.1 to 10 mass %, more preferably 0.2 to 8 mass %, and even more preferably 0.4 to 6 mass %.

If a concentration of the polymer (B) is equal to or higher than the lower limit value, a porous membrane tends to be easily obtained, and if a concentration thereof is equal to or lower than the upper limit value, solubility of the membrane-forming polymer (A) in the solvent (S) tends to increase.

A concentration of the polymer (C) in the membrane-manufacturing stock solution (100 mass %) is preferably 5 to 30 mass %, more preferably 6 to 25 mass %, and even more preferably 8 to 20 mass %.

If a concentration of the polymer (C) is equal to or higher than the lower limit value, a porous membrane tends to be easily obtained, and if a concentration thereof is equal to or lower than the upper limit value, solubility of the membrane-forming polymer (A) and the polymer (B) in the solvent (S) tends to increase.

A concentration of the solvent (S) in the membrane-manufacturing stock solution (100 mass %) is preferably 50 to 89.9 mass %, more preferably 55 to 85 mass %, and even more preferably 60 to 80 mass %.

If a concentration of the solvent (S) is equal to or higher than the lower limit value, a high permeation flux tends to be obtained, and if a concentration thereof is equal to or lower than the upper limit value, a porous membrane can be easily obtained.

(Coagulation Step)

An aqueous solution containing 50 mass % or less of a solvent (S) is preferably as a coagulation solution in terms of controlling pore sizes of the membrane.

The solvent (S) contained in the coagulation solution and the solvent (S) contained in the membrane-manufacturing stock solution may be the same type or different types, but it is preferably for the solvents to be the same type.

A temperature of the coagulation solution is preferably 10 to 90° C. If a temperature of the coagulation solution is equal to or higher than the lower limit value, water permeability of the porous membrane tend to be improved, and if a temperature thereof is equal to or lower than the upper limit value, the porous membrane tends to well maintain mechanical strength.

(Washing Step)

It is preferable to wash and remove solvent (S) remaining in the porous membrane precursor and some of or the entire polymer (C) by immersing the porous membrane precursor in either or both of water and an aqueous solution such as a sodium hypochlorite aqueous solution having a temperature of 40 to 100° C.

The step of immersing the porous membrane precursor in water and/or an aqueous solution such as a sodium hypochlorite aqueous solution to remove the polymer (C) can be repeated a plurality of times.

(Drying Step)

It is preferably to dry the washed porous membrane precursor at a temperature of 60 to 120° C. for 1 minute to 24 hours.

If a drying temperature is equal to or higher than the lower limit value, a drying process time can be shortened and a production cost can be reduced, which is preferable in terms of industrial production, and if a drying temperature is equal to or lower than the upper limit value, excessive shrinkage of the porous membrane precursor in the drying step can be prevented, and a minute crack is not likely to occur on an outer surface of the porous membrane.

In addition, the porous membrane of the present invention is a porous membrane to produce treated water by filtering water to be treated therethrough and has a plurality of porous layers containing the membrane-forming polymer (A), it can be manufactured using a method including the following steps.

Step (a): Step of preparing a plurality of membrane-manufacturing stock solutions containing the membrane-forming polymer (A) and the polymer (C).

Step (b): Step of manufacturing a porous membrane precursor having a plurality of porous precursor layers corresponding to each of the plurality of membrane-manufacturing stock solutions using the plurality of membrane-manufacturing stock solutions.

Step (c): Step of obtaining a porous membrane having a plurality of porous layers containing the membrane-forming polymer (A) by removing some of or the entire polymer (C) from the porous membrane precursor.

(Step (a))

In step (a), a plurality of membrane-manufacturing stock solutions are prepared, for example, by dissolving the membrane-forming polymer (A) and the polymer (C), and the polymer (B) if necessary, in the solvent (S).

Step (a) can be performed according to the above-described preparation step.

Furthermore, when the porous membrane of the present invention is a porous membrane to produce treated water by filtering water to be treated therethrough and has a plurality of porous layers containing the membrane-forming polymer (A), a membrane-manufacturing stock solution (x) at least associated with the outermost layer ($\alpha$) among the plurality of membrane-manufacturing stock solutions further contains the polymer (B).

A mass $x_B$ of the polymer (B) among all polymers contained in the membrane-manufacturing stock solution (x) is greater than a mass $y_B$ of the polymer (B) among all polymers contained in a membrane-manufacturing stock solution (y) corresponding to the other porous layer ($\beta$) other than the outermost layer ($\alpha$). The mass $x_B$ is preferably 1.2 times or more, and more preferably 2 times or more the mass $y_B$. Most preferably, the mass $y_B$ is 0.

A concentration of the polymer (B) in the membrane-manufacturing stock solution (x) (100 mass %) is preferably 0.1 to 10 mass %, more preferably 0.2 to 8 mass %, and even more preferably 0.4 to 6 mass %.

If a concentration of the polymer (B) is equal to or higher than the lower limit value, a porous membrane can be easily obtained, and if a concentration thereof is equal to or lower than the upper limit value, solubility of the membrane-forming polymer (A) in the solvent (S) tends to increase.

A concentration of the polymer (B) in the membrane-manufacturing stock solution (y) (100 mass %) is preferably 0 to 10 mass %, more preferably 0 to 8 mass %, and even more preferably 0 to 6 mass %.

(Step (b))

In step (b), for example, the plurality of membrane-manufacturing stock solutions are arranged in layers and immersed in a coagulation solution in that state to be coagulated, and thereby a porous membrane precursor having a plurality of porous precursor layers each corresponding to the plurality of membrane-manufacturing stock solutions is manufactured.

Step (b) can be performed according to the above-described coagulation step.

(Step (c))

Step (c) can be performed according to the above-described washing step and drying step.

Since the above-described porous membrane of the present invention includes the membrane-forming polymer (A) and the polymer (B), it has high anti-fouling properties.

In addition, the porous membrane can allow water to flow at low pressure even if it is dried once.

In addition, since the porous membrane has hydrophilicity in the course of membrane manufacturing only by adding the polymers in the membrane-manufacturing stock solutions, it can be manufactured in a simple method without requiring solvent washing and crosslinking treatment.

Particularly, when the porous membrane of the present invention is a porous membrane to produce treated water by filtering water to be treated therethrough and has a plurality of porous layers containing the membrane-forming polymer (A), since the outermost layer (α) of the porous membrane on the side of water to be treated includes the polymer (B), the porous membrane on the side of the water to be treated has high hydrophilicity and the porous membrane also has high water permeability overall. In addition, since the outermost layer (α) of the porous membrane on the side of water to be treated includes the polymer (B), the porous membrane on the side of the water to be treated exhibits excellent anti-fouling properties in the membrane bioreactor method. In addition, since a mass $α_B$ of the polymer (B) among all polymers contained in the outermost layer (α) is greater than a mass $β_B$ of the polymer (B) among all polymers contained in the other porous layer (β) other than the outermost layer (α), if the outermost layer (α) is set to include the polymer (B) in an amount necessary and sufficient for exhibiting hydrophilicity, water permeability, and anti-fouling properties, an amount of the polymer (B) to be contained in the other porous layer (β) can be reduced or set to 0. For this reason, a use amount of the expensive polymer (B) can be reduced more and thus the porous membrane can be manufactured at a lower cost in comparison to a case in which the polymer (B) is uniformly contained in the entire porous membrane.

In addition, since it the polymer (B) may only be contained at least in the outermost layer of the porous membrane on the side of the water to be treated, the porous membrane can be easily manufactured without requiring a special treatment such as solvent washing, crosslinking treatment, or the like.

[Membrane Module]

A membrane module of the present invention has the porous membrane of the present invention.

Examples of the membrane module include a flat membrane module having two flat membranes and a frame-like support supporting four sides of the flat membranes, a hollow fiber membrane module having a plurality of hollow fiber membranes and a housing supporting ends of the hollow fiber membranes, and the like.

[Water Treatment Device]

A water treatment device of the present invention has the membrane module of the present invention.

Examples of the water treatment device include a membrane separation activated sludge device having a water tank, a membrane module disposed inside the water tank, and an aeration tube disposed below the membrane module, an air supply/deaeration device having a fluid flow passage and a membrane module disposed inside the fluid flow passage, and the like.

EXAMPLES

Although the present invention will be described in more detail in Examples below, the present invention is not limited thereto.

"Part" and "%" in Examples each indicate "part by mass" and "mass %."

[Composition of Porous Membrane (Hollow Fiber Membranes M-A1 to M-A7, M'-A1 to M'-A5 and M'-B1)]

(1) After each of the hollow fiber membranes was cut and opened, the support thereof was drawn out using tweezers to be removed from the hollow fiber membranes, and the remaining porous membranes were used as samples.

(2) The sample of (1) dissolved in a deuterated solvent (N,N-dimethyl sulfoxide-d6 to which tetramethylsilane had been added) and thereby a 1 mass % solution was prepared.

(3) The $^1$H-NMR spectrum of the solution of (2) was measured at 80° C. using "JNM-EX270" manufactured by JEOL Ltd.

(4-1) The $^1$H-NMR spectra of the following polymers or macromonomers were measured (the measurement conditions are the same as in (2) and (3)).

Polyvinylidene Fluoride:

Kynar (registered trademark) 761A manufactured by Arkema

Poly(2-methoxyethyl acrylate):

A polymer polymerized under the same conditions as in Synthesis example 4 except that 2-hydroxyethyl methacrylate and macromonomers were not used.

Poly(methyl methacrylate) macromonomer:

A macromonomer synthesized under the same conditions as in the synthesis of a macromonomer (b3-1), which will be described below.

Poly(2-hydroxyethyl methacrylate):

A polymer polymerized under the same conditions as in Synthesis example 4 except that 2-methoxyethyl acrylate and macromonomers were not used.

Polyvinylpyrrolidone:

PVP K80 manufactured by Nippon Shokubai Co., Ltd.

(4-2) The following peaks were assigned to the $^1$H-NMR spectrum measured in (3) with reference to the $^1$H-NMR spectra measured in (4-1) and the $^1$H-NMR spectra of polyvinylidene fluoride, 2-methoxyethyl acrylate, 2-hydroxyethyl methacrylate and polyvinylpyrrolidone published in the organic compound spectrum database (SDBS) provided by National Institute of Advanced Industrial Science and Technology.

Vinylidene fluoride unit: 2.2 to 2.4 ppm, 2.7 to 3.1 ppm
2-methoxyethyl acrylate unit: 4.0 to 4.2 ppm, 3.4 to 3.6 ppm, 3.2 to 3.3 ppm
2-hydroxyethyl methacrylate unit: 4.7 to 4.9 ppm, 3.8 to 4.1 ppm, 3.5 to 3.7 ppm
Polymethyl methacrylate macromonomer unit: 3.5 to 3.7 ppm
Polyvinylpyrrolidone unit: 1.7 to 1.8 ppm, 1.8 to 1.9 ppm, 3.5 to 3.6 ppm (5) An integral ratio of each unit was calculated from the areas of the peaks assigned in (4), and a concentration (mol %) of each unit was calculated assuming that the sum of the integral ratios of all the units to be 100 (mol %). However, an integral ratio of a macromonomer unit was calculated based on a number average molecular weight instead of a molecular weight.

(6) A concentration (mass %) of each of the units was calculated by dividing the concentration (mol %) of each of the units by the molecular weight of each of the units.

[Composition of Porous Membrane (Hollow Fiber Membranes M-B1 to B4 and M'-B2 to B3)]

(1) After each of hollow fiber membranes was cut and opened, the support thereof was pulled by tweezers and removed from the hollow fiber membrane, and thereby the support was separated from the porous membrane.

(2) The outer layer and the inner layer of the porous membrane were peeled and separated using tweezers and each of the layers was used as a sample.

(3) Then, a concentration (mass %) of each unit in each layer was measured similarly to (3) to (6) with respect to the above-described measurement of "Composition of porous membrane (hollow fiber membranes M-A1 to M-A7, M'-A1 to M'-A5, and M'-B1)."

[Composition of Polymer (B) and Polymer (B') (which Means a Polymer Serving as a Comparison Target of the Polymer (B))]

The composition was measured similarly to the above-described "composition of porous membrane" except that the polymer (B) and the polymer (B') were used as samples.

[Introduction Ratio of Terminal Double Bond of Unit (b3)]

(1) The synthesized macromonomer (b3) dissolved in a deuterated solvent (N,N-dimethyl sulfoxide-d6 to which tetramethylsilane had been added) and thereby a 1 mass % solution was prepared.

(2) The $^1$H-NMR spectrum of the solution of (1) was measured at 40° C. using "JNM-EX270" manufactured by JEOL Ltd.

(3) An introduction ratio of a terminal double bond was obtained from the peak area of the measured $^1$H-NMR spectrum with reference to the spectrum data published in the organic compound spectrum database (SDBS) provided by National Institute of Advanced Industrial Science and Technology.

[Measurement of Mass Average Molecular Weight (Mw) of Membrane-Forming Polymer (A)]

An Mw of the membrane-forming polymer (A) was obtained under the following conditions using GPC (with "HLC-8020" (product name) manufactured by Tosoh Corporation).

Column: TSK guard column a (7.8 mm×40 mm) and three TSK-GEL α-M (7.8×300 mm) were connected in series.

Eluent: N,N-dimethylformamide (DMF) solution of lithium bromide (LiBr) (having a concentration of LiBr: 20 mM).

Measurement temperature: 40° C.

Flow rate: 0.1 mL/min.

Further, an Mw of the membrane-forming polymer (A) was obtained by using a calibration curve created using the polystyrene standards (peak top molecular weight (Mp))=eight types including 76,969,900, 2,110,000, 1,260,000, 775,000, 355,000, 186,000, 19,500, and 1,050) manufactured by Tosoh Corporation and styrene monomers (molecular weight (M)=104) manufactured by NS styrene monomer Co., Ltd.

[Measurement of Number Average Molecular Weight (Mn) and Molecular Weight Distribution (Mw/Mn) of Polymer (B) and Polymer (B')]

Mn and Mw/Mn of the unit (b3), the polymer (B), and the polymer (B') were obtained under the following conditions using GPC ("HLC-8220" (product name) manufactured by Tosoh Corporation).

Column: TSK guard column super H-L (4.6×35 mm) and two TSK-GEL super HZM-H (4.6×150 mm) were connected in series.

Eluent: DMF solution of lithium chloride (LiCl) (concentration of LiCl: 0.01 M).

Measurement temperature: 40° C.

Flow rate: 0.6 mL/min.

Further, Mn and Mw/Mn of the polymer (B) and the polymer (B') were obtained by using a calibration curve created using the polystyrene standards (peak top molecular weight (Mp))=twelve types including 6,200,000, 2,800,000, 1,110,000, 707,000, 354,000, 189,000, 98,900, 37,200, 9,830, 5,870, 870, and 500) manufactured by Tosoh Corporation.

In addition, Mn and Mw/Mn of the unit (b3) were obtained by using a calibration curve created using polymethyl methacrylate (Mp=four types including 141,500, 55,600, 10,290, and 1,590) manufactured by Polymer Laboratories Ltd.

[Outer Diameter of Hollow Fiber Membrane]

Outer diameters (membrane outer diameters) of the hollow fiber membranes were measured in the following method.

Samples to be measured were cut to about 10 cm, several samples were bundled, and the entire was covered with a polyurethane resin. The polyurethane resin was also set to enter the hollow part of the support. After the polyurethane resin was cured, thin pieces having a thickness (in the longitudinal direction of the membranes) of about 0.5 mm were sampled using a razor blade. The cross-sections of the sampled hollow fiber membranes were observed using a projector (Profile Projector V-12 manufactured by Nikon Corporation) with an objective lens at 100-times magnification. The outer diameters were read by aligning the mark (line) at the positions of the outer surfaces of the cross-sections of the hollow fiber membranes in the X and Y directions. This measurement was repeated three times, and the average of outer diameters was obtained.

[Thickness of the Porous Layer]

Thicknesses of the porous layer were measured in the following method.

Sampling was performed in the same method as that of the samples whose outer diameters had been measured. The cross-sections of the sampled hollow fiber membranes were observed using a projector (Profile Projector V-12 manufactured by Nikon Corporation) with an objective lens at 100-times magnification. The thicknesses were read by aligning the mark (line) at the outer surfaces and the inner surfaces of the thicknesses of the cross-sections of the hollow fiber membranes at 3 o'clock. Likewise, the thicknesses were read at 9 o'clock, 12 o'clock, and 6 o'clock in this order. The measurement was performed three times and the average of the inner diameters was obtained.

In addition, the thicknesses of the outer layer and the inner layer of the porous layer were read in a similar way to the above description, and then when there is an interface showing the clear contrast between the outer surface of the hollow fiber membranes and the outer surface of the support of the hollow fiber membranes, a length from the interface to the outer surface of hollow fiber membranes was measured as a thickness of the outer layer, and a length from the interface to the outer surface of the support of the hollow fiber membranes was measured as a thickness of the inner layer. The measurement was performed three times and the averages of the thicknesses of the outer layer and the inner layer were obtained.

[Pore Size of Porous Layer]

Pore sizes (average pore size) of fine pores of the porous layer were measured in the following method.

A cross-section of the porous layer was photographed using a scanning-type electron microscope at 5,000-times magnification, and the average pore size of the fine pores was obtained by performing an image analysis process on the obtained photo. As image analysis processing software, Image-Pro Plus version 5.0 manufactured by Media Cybernetics was used.

[Measurement of Water Permeability $W_{w100}$ of Hollow Fiber Membrane]

A hollow fiber membrane was cut to 4 cm in length, and the opening of one end surface thereof was sealed with a polyurethane resin. After the hollow fiber membrane was immersed in ethanol in a container, the inside of the container was depressurized for 5 minutes or longer, thereby the inside of the hollow fiber membrane was deaerated and replaced with ethanol. The hollow fiber membrane was immersed in pure water for 5 minutes or longer, ethanol was replaced with pure water, and the hollow fiber membrane was taken out. Pure water (25° C.) was put in a container, the container and the other end surface of the hollow fiber membrane were connected by a tube, 100 kPa air pressure was applied to the container, and the amount of pure water coining out from the hollow fiber membrane was measured for 1 minute. This measurement was performed three times, the average was obtained, the value was divided by the surface area of the sample, and the result was set as a pure water permeation flow rate $W_{w100}$ in a wet condition.

[Measurement of Water Permeability $W_{d20}$ and $W_{d100}$ of Hollow Porous Membrane]

A hollow fiber membrane was cut to 4 cm in length, and the opening of one end surface thereof was sealed with a polyurethane resin. Pure water (25° C.) was put in a container, the container and the other end surface of the hollow fiber membrane were connected by a tube, 100 kPa air pressure was applied to the container and held for 1 minute, and the inside of the hollow fiber membrane was deaerated and replaced with pure water. The hollow fiber membrane was input into a hot air dryer set to a temperature of 80° C. for 24 hours, and the hollow fiber membrane was dried. Pure water (25° C.) was put in a container, the container and the dried hollow fiber membrane was immediately connected by a tube. 20 kPa air pressure was applied to the container, the amount of pure water coming out from the hollow fiber membrane was measured for 1 minute, the air pressure was increased to 100 kPa, and the amount of pure water coming out from the hollow fiber membrane was measured for 1 minute. Alternatively, when only $W_{d100}$ was measured, the air pressure was increased to 100 kPa, and the amount of pure water coining out from the hollow fiber membrane was measured for 1 minute. This measurement was performed three times, the average was obtained, the value was divided by the surface area of the sample, and the result was set as pure water permeation flow rates $W_{d20}$ and $W_{d100}$ in a dry condition.

[Calculation of Hydrophilicity]

As an indicator of hydrophilicity, hydrophilicity (HP) was calculated with the following indices.

$$HP = W_{d20}/W_{w100}$$

[Bubble Point Pressure of Hollow Fiber Membrane]

A hollow fiber membrane was cut to 4 cm in length, and the opening of one end surface thereof was sealed with a polyurethane resin. After the hollow fiber membrane was depressurized in ethanol for 5 minutes or longer, it was immersed in pure water for 5 minutes or longer, ethanol was replaced with pure water. The hollow fiber membrane was immersed in pure water (25° C.), the other end surface of the hollow fiber membrane was connected to a tube, and air pressure was slowly applied to the hollow part of the hollow fiber membrane from the tube. The air pressure was gradually increased, and the pressure at which bubbles were found on the surface of the hollow fiber membrane was measured. This measurement was performed 10 times, and the average was obtained.

<Synthesis of Cobalt Chain Transfer Agent CoBF-1>

1.00 g of cobalt acetate (II) tetrahydrate (manufactured by Waco Pure Chemical Corporation, Waco special grade); 1.93 g of diphenyl glyoxime (manufactured by Tokyo Chemical Industry Co., Ltd., EP grade); and 80 mL of a diethyl ether which were replaced with nitrogen for 30 minutes or longer and had undergone deoxygenation (manufactured by Kanto Kagaku, special grade) was input into a reactor equipped with a stirrer under a nitrogen atmosphere, they were stirred for 30 minutes at room temperature, and thereby a mixture was obtained.

10 mL of boron trifluoride diethyl ether complex (manufactured by Tokyo Chemical Industry Co., Ltd., EP grade) was added to the obtained mixture, it was stirred for 6 hours, and then a reactant was obtained.

The obtained reactant was filtered, the solid was washed with diethyl ether (manufactured by Kanto Kagaku, special grade), dried in vacuum for 15 hours, and thereby a cobalt chain transfer agent CoBF-1 was obtained as 2.12 g of reddish-brown solids.

<Synthesis of Dispersing Agent 1>

61.6 parts by mass of a 17 mass % potassium hydroxide aqueous solution, 19.1 parts by mass of methyl methacrylate (manufactured by Mitsubishi Chemical Corporation, Acryester (registered trademark) M), 19.3 parts by mass of deionized water were added in a reactor equipped with a stirrer, a cooling tube, and a thermometer. The mixture in the reactor was stirred at room temperature, the exothermic peak was checked, and then it was stirred for 4 hours, and thereby a reaction solution was obtained. The obtained reaction solution was cooled to room temperature and a potassium methacrylate aqueous solution was obtained.

900 parts by mass of deionized water, 70 parts by mass of 42 mass % 2-sulfoethyl sodium methacrylate aqueous solution (manufactured by Mitsubishi Chemical Corporation, Acryester (registered trademark) SEM-Na), 16 parts by mass of the obtained potassium methacrylate aqueous solution, and 7 parts by mass of methyl methacrylate (manufactured by Mitsubishi Chemical Corporation, Acryester (registered trademark) M) were put in a polymerization device equipped with a stirrer, a cooling tube, and a thermometer and stirred, and the temperature thereof was increased to 50° C. while replacing the inside of the polymerization equipment with nitrogen. During the process, 0.053 parts by mass of 2,2'-Azobis (2-methylpropionamidine) dihydrochloride (manufactured by Waco Pure Chemical Corporation, product name: V-50) was added thereto as a polymerization initiator, and the temperature was increased to 60° C. After the addition of the polymerization initiator, 1.4 parts by mass of methyl methacrylate (manufactured by Mitsubishi Chemical Corporation, Acryester (registered trademark) M) was added five times in total every 15 minutes. Then, after the mixture was kept at 60° C. for 6 hours while stirring it in the polymerization apparatus, the mixture was cooled to room temperature, and thereby a dispersing agent 1 with a solid content of 8 mass % which is a transparent aqueous solution was obtained.

<Synthesis of Macromonomer (b3-1)>

100 parts by mass of methyl methacrylate (manufactured by Mitsubishi Chemical Corporation, Acryester (registered trademark) M), 150 parts by mass of deionized water, 1.39 parts by mass of sodium sulfate, 1.53 parts by mass of the dispersing agent 1, and 0.00045 parts by mass of a cobalt chain transfer agent CoBF-1 were added in a flask with a cooling tube. The cobalt chain transfer agent CoBF-1 dissolved with the mixture inside the flask heated to 70° C., and the inside was replaced with nitrogen through nitrogen bubbling. After 0.12 parts by mass of 1,1,3,3-tetramethylbutylperoxy-2-ethylhexanate (manufactured by NOF Corporation, product name: Perocta (registered trademark) O) was added thereto as a polymerization initiator, the mixture was kept for 6 hours with an internal temperature maintained at 70° C., then polymerization was completed, and thereby a polymerization product was obtained. The obtained polymerization product was cooled to room temperature and filtered, and thereby a polymer was recovered. After the obtained polymer was washed with water, it was dried in vacuum at 50° C. overnight, and thereby a macromonomer (b3-1) was obtained.

A number average molecular weight (Mn) of the macromonomer (b3-1) was 40,000, and a molecular weight distribution (Mw/Mn) thereof was 2.3. An introduction ratio of a terminal double bond of the macromonomer (b3-1) was substantially 100%. The macromonomer (b3-1) was a compound in which R of the above-described formula (2) is a methyl group.

<Synthesis of Macromonomer (b3-2)>

100 parts by mass of methyl methacrylate (manufactured by Mitsubishi Chemical Corporation, Acryester (registered trademark) M), 150 parts by mass of deionized water, 1.39 parts by mass of sodium sulfate, 1.53 parts by mass of the dispersing agent 1, and 0.003 parts by mass of a cobalt chain transfer agent CoBF-1 were added in a flask with a cooling tube. The cobalt chain transfer agent CoBF-1 dissolved with the mixture inside the flask heated to 70° C., and the inside was replaced with nitrogen through nitrogen bubbling. After 0.12 parts by mass of 1,1,3,3-tetramethylbutylperoxy-2-ethylhexanate (manufactured by NOF Corporation, product name: Perocta (registered trademark) O) was added thereto as a polymerization initiator, the mixture was kept for 6 hours with an internal temperature maintained at 70° C., then polymerization was completed, and thereby a polymerization product was obtained. The obtained polymerization product was cooled to room temperature and filtered, and thereby a polymer was recovered. After the obtained polymer was washed with water, it was dried in vacuum at 50° C. overnight, and thereby a macromonomer (b3-2) was obtained.

A number average molecular weight (Mn) of the macromonomer (b3-2) was 18,000, and a molecular weight distribution (Mw/Mn) thereof was 2.1. An introduction ratio of a terminal double bond of the macromonomer (b3-2) was substantially 100%. The macromonomer (b3-2) was a compound in which R of the above-described formula (2) is a methyl group.

Synthesis of Polymer (B)

Synthesis Example 1

(Synthesis of Polymer (B-1))

A monomer composition constituted by 59 parts by mass of 2-methoxyethyl acrylate (unit (b1)) (manufactured by Waco Pure Chemical Corporation, Waco first grade), 1 parts by mass of 2-hydroxyethyl methacrylate (unit (b2)) (manufactured by Mitsubishi Chemical Corporation, Acryester (registered trademark) HO), 40 parts by mass of the macromonomer (b3-1) (unit (b3)), and 150 parts by mass of N,N-dimethylacetamide (solvent (S)) (manufactured by Waco Pure Chemical Corporation, guaranteed reagent) was added in a flask with a cooling tube, and the inside of the flask was replaced with nitrogen through nitrogen bubbling. The monomer composition was warmed up with an internal temperature maintained at 55° C., and 0.1 parts by mass of 2,2'-azobis(2,4'-dimethylvaleronitrile) (manufactured by Waco Pure Chemical Corporation, product name: V-65) was added thereto as a radical polymerization initiator, and the mixture was kept for 5 hours. The temperature of the composition was increased to 70° C., 0.15 parts by mass of V-65 was further added thereto, the composition was kept for 60 minutes, and thereby polymerization was completed. Then, the composition was cooled to room temperature, and thereby a polymerization solution (D-1) containing a polymer (B-1) was obtained.

Ratios of respective units constituting the polymer (B-1), and the number average molecular weight (Mn), the mass average molecular weight (Mw), and the molecular weight distribution (Mw/Mn) of the polymer (B-1) are shown in Table 1.

Synthesis Examples 2 to 5 and 7 to 9

(Synthesis of Polymers (B-2) to (B-5) and (B'-2) to (B'-4))

Except that the composition of the monomer composition, the polymerization initiator, and the solvent (S) were changed as shown in Table 1, a polymerization solution (D-2) containing a polymer (B-2), a polymerization solution (D-3) containing a polymer (B-3), a polymerization solution (D-4) containing a polymer (B-4), a polymerization solution (D-5) containing a polymer (B-5), a polymerization solution (D-7) containing a polymer (B'-2), a polymerization solution (D-8) containing a polymer (B'-3), a polymerization solution (D-9) containing a polymer (B'-4) were obtained respectively in a similar method to that for the polymer (B-1).

Ratios of respective units constituting the obtained polymers, and the number average molecular weights (Mn), mass average molecular weights (Mw), and molecular weight distributions (Mw/Mn) of the obtained polymers are shown in Table 1.

Synthesis Example 6

(Synthesis of Polymer (B'-1))

A monomer composition constituted by 40 parts by mass of 2-hydroxyethyl methacrylate (unit (b2)) (manufactured by Mitsubishi Chemical Corporation, Acryester (registered trademark) HO), 40 parts by mass of methyl methacrylate (unit (b4)), 20 parts by mass of 2-dimethylaminoethyl methacrylate (unit (b4)) (manufactured by Mitsubishi Chemical Corporation, Acryester (registered trademark) DM), and 150 parts by mass of N,N-dimethylacetamide (solvent (S)) (manufactured by Waco Pure Chemical Corporation, guaranteed reagent) was added in a flask with a cooling tube, and the inside of the flask was replaced with nitrogen through nitrogen bubbling. The monomer composition was warmed up with an internal temperature maintained at 70° C., and 0.1 parts by mass of 2,2'-azobis(2,4'-dimethylvaleronitrile) (manufactured by Waco Pure Chemical Corporation, product name: V-65) was added thereto as a radical polymerization initiator, and the mixture was kept for 5 hours. The temperature of the composition was increased to 80° C., 0.2 parts by mass of 2,2'-azobisisobutyronitrile was further added thereto, the composition was kept for 60 minutes, and thereby polymerization was completed. Then, the composition was cooled to room temperature, and thereby a polymerization solution (D-6) containing a polymer (B'-1) was obtained.

Ratios of respective units constituting the polymer (B'-1), and the number average molecular weight (Mn), the mass average molecular weight (Mw), and the molecular weight distribution (Mw/Mn) of the polymer (B'-1) are shown in Table 1.

TABLE 1

| | | | | Synthesis examples | | | | |
|---|---|---|---|---|---|---|---|---|
| | | | | 1 | 2 | 3 | 4 | 5 |
| Types of polymer (B) | | | | B-1 | B-2 | B-3 | B-4 | B-5 |
| Type of polymerization solution (D) | | | | D-1 | D-2 | D-3 | D-4 | D-5 |
| Monomer composition | Composition (parts by mass) | MEA | | 59 | 51 | 42 | 51 | 67 |
| | | HEMA | | 1 | 9 | 18 | 9 | 12 |
| | | Macromonomer (b3-1) | | 40 | 40 | 40 | 40 | — |
| | | Macromonomer (b3-2) | | — | — | — | — | 21 |
| | | MMA | | — | — | — | — | — |
| | | DMAEMA | | — | — | — | — | — |
| | | V-65 | | 0.25 | 0.25 | 0.25 | 0.25 | 0.25 |
| | | AIBN | | — | — | — | — | — |
| | | DMAc | | 150 | 150 | 150 | 200 | 200 |
| Polymer (B) | Concentration of each unit | MEA unit | (mass %) | 58.3 | 50.3 | 41.3 | 50.5 | 66.1 |
| | | | (mol %) | 98.1 | 84.5 | 69.3 | 84.5 | 84.1 |
| | | HEMA unit | (mass %) | 1.0 | 9.1 | 18.2 | 9.1 | 12.3 |
| | | | (mol %) | 1.7 | 15.3 | 30.5 | 15.2 | 15.7 |
| | | PMMA-MM unit | (mass %) | 40.7 | 40.6 | 40.5 | 40.4 | 21.6 |
| | | | (mol %) | 0.2 | 0.2 | 0.2 | 0.2 | 0.2 |
| | | MMA unit | (mass %) | — | — | — | — | — |
| | | | (mol %) | — | — | — | — | — |
| | | DMAEMA unit | (mass %) | — | — | — | — | — |
| | | | (mol %) | — | — | — | — | — |
| | Molecular weight | Mn | | 80,000 | 88,000 | 96,000 | 47,000 | 46,000 |
| | Molecular weight distribution | Mw | | 252,000 | 283,000 | 276,000 | 159,000 | 193,000 |
| | | Mw/Mn | | 3.2 | 3.2 | 2.9 | 3.4 | 4.2 |

| | | | | Synthesis examples | | | |
|---|---|---|---|---|---|---|---|
| | | | | 6 | 7 | 8 | 9 |
| Types of polymer (B) | | | | B'-1 | B'-2 | B'-3 | B'-4 |
| Type of polymerization solution (D) | | | | D-6 | D-7 | D-8 | D-9 |
| Monomer composition | Composition (parts by mass) | MEA | | — | 15 | 85 | — |
| | | HEMA | | 40 | 35 | — | 50 |
| | | Macromonomer (b3-1) | | — | 50 | 15 | — |
| | | Macromonomer (b3-2) | | — | — | — | — |
| | | MMA | | 40 | — | — | 50 |
| | | DMAEMA | | 20 | — | — | — |
| | | V-65 | | 0.1 | 0.25 | 0.25 | — |
| | | AIBN | | 0.2 | — | — | 0.2 |
| | | DMAc | | 150 | 150 | 300 | 150 |
| Polymer (B) | Concentration of each unit | MEA unit | (mass %) | — | 12.3 | 84.3 | — |
| | | | (mol %) | — | 25.5 | 99.9 | — |
| | | HEMA unit | (mass %) | 40.0 | 35.7 | — | 50.0 |
| | | | (mol %) | 36.8 | 74.1 | — | 43.5 |
| | | PMMA-MM unit | (mass %) | — | 52.0 | 15.7 | — |
| | | | (mol %) | — | 0.4 | 0.1 | — |
| | | MMA unit | (mass %) | 40.0 | — | — | 50.0 |
| | | | (mol %) | 47.9 | — | — | 56.5 |
| | | DMAEMA unit | (mass %) | 20.0 | — | — | — |
| | | | (mol %) | 15.2 | — | — | — |
| | Molecular weight | Mn | | 130,000 | 79,000 | 34,000 | 160,000 |
| | Molecular weight distribution | Mw | | 600,000 | 302,000 | 181,000 | 730,000 |
| | | Mw/Mn | | 4.6 | 3.8 | 5.3 | 4.6 |

The abbreviations in the table represent the following meanings (the same applies to the following tables).

MEA: 2-methoxyethyl acrylate (manufactured by Waco Pure Chemical Corporation, Waco first grade)

HEMA: 2-hydroxyethyl methacrylate (manufactured by Mitsubishi Chemical Corporation, Acryester (registered trademark) HO)

MMA: Methyl methacrylate (manufactured by Mitsubishi Chemical Corporation, Acryester (registered trademark) M)

DMAEMA: Dimethylaminoethyl methacrylate (manufactured by Mitsubishi Chemical Corporation, Acryester (registered trademark) DM)

V-65: 2,2'-azobis(2,4'-dimethylvaleronitrile) (manufactured by Waco Pure Chemical Corporation, product name: V-65)

DMAc: N,N-diinethylacetamide (manufactured by Waco Pure Chemical Corporation, guaranteed reagent)

PMMA-MM: Polymethyl methacrylate macromonomer

Preparation of Membrane-Manufacturing Stock Solution

Preparation Example A1

(Preparation of Membrane-Manufacturing Stock Solution (A1))

1.2 parts by mass of polyvinylidene fluoride (PVDF) (manufactured by Arkema, Kynar (registered trademark) 761A, Mw=550,000) as the membrane-forming polymer (A), 0.15 parts by mass of the polymerization solution (D-1) containing the polymer (B-1) as the polymer (B), 0.72 parts by mass of polyvinylpyrrolidone (PVP) (manufactured by Nippon Shokubai Co., Ltd., PVP K80, Mw=900,000) as the polymer (C), and 5.01 parts by mass of N,N-dimethylacetamide (manufactured by Waco Pure Chemical Corporation, Waco special grade) as the solvent (S) were put in a stainless steel container, they were stirred at 60° C. for 5 hours, and thereby a membrane-manufacturing stock solution (A1) was prepared. The obtained membrane-manufacturing stock solution was left still at 25° C. for one day.

Preparation Examples A2 to A7 and B1

(Preparation of Membrane-Manufacturing Stock Solutions (A2) to (A7) and (B1))

Except that the compositions of the membrane-forming polymer (A), the polymer (B), and the polymer (C), and the solvent (S) were changed as shown in Table 2, membrane-manufacturing stock solutions (A2) to (A7) and (B1) were obtained respectively in a similar method as that for the membrane-manufacturing stock solution (A1).

Preparation Example B2

(Preparation of Membrane-Manufacturing Stock Solution (B2))

Except that the amount of N,N-dimethylacetamide was changed to 5.10 parts without blending the polymerization solution (D-2) therewith, a membrane-manufacturing stock solution (B2) was obtained in a similar method to that for the membrane-manufacturing stock solution (B1).

Preparation Example B3

(Preparation of Membrane-Manufacturing Stock Solution (B3))

Except that the amount of the polymerization solution (D-2) was changed to 0.15 parts and the amount of N,N-dimethylacetamide was changed to 5.01 parts, a membrane-manufacturing stock solution (B3) was obtained in a similar method to that for the membrane-manufacturing stock solution (B1).

Preparation Example A'1

(Preparation of Membrane-Manufacturing Stock Solution (A'1))

Except that the polymerization solution used in Preparation example A1 was not used, a membrane-manufacturing stock solution (A'1) was obtained in a similar method to that for the membrane-manufacturing stock solution (A1).

Preparation Examples A'2 to A's (Preparation of Membrane-Manufacturing Stock Solution (A'2) to (A'5))

Except that the compositions of the membrane-forming polymer (A), the polymer (B), and the polymer (C), and the solvent (S) were changed as shown in Table 2, membrane-manufacturing stock solutions (A'2) to (A'S) were obtained in a similar method to that for the membrane-manufacturing stock solution (A1).

TABLE 2

| | | | Preparation examples | | | | | | | | | | | | | |
|---|---|---|---|---|---|---|---|---|---|---|---|---|---|---|---|---|
| | | | A1 | A2 | A3 | A4 | A5 | A6 | A7 | B1 | B2 | B3 | A'1 | A'2 | A'3 | A'4 | A'5 |
| Membrane-manufacturing stock solutions | | | A1 | A2 | A3 | A4 | A5 | A6 | A7 | B1 | B2 | B3 | A'1 | A'2 | A'3 | A'4 | A'5 |
| Polymer (A) | Kynar 761A | Content (part by mass) | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Polymer (B) | Type | | B-1 | B-2 | B-3 | B-1 | B-4 | B-5 | B-2 | B-2 | — | B-2 | — | B'-1 | B'-2 | B'-3 | B'-4 |
| | Polymerization solution | Type | D-1 | D-2 | D-3 | D-1 | D-4 | D-5 | D-2 | D-2 | — | D-2 | — | D-6 | D-7 | D-8 | D-9 |
| | | Content (part by mass) | 0.15 | 0.15 | 0.15 | 0.15 | 0.15 | 0.15 | 0.30 | 0.30 | — | 0.15 | — | 0.15 | 0.15 | 0.24 | 0.15 |
| Polymer (C) | K80 | Content (part by mass) | 0.72 | 0.72 | 0.72 | 0.78 | 0.78 | 0.78 | 0.78 | 0.78 | 0.78 | 0.78 | 0.78 | 0.78 | 0.72 | 0.72 | 0.72 |
| Solvent (S) | DMAc | Content (part by mass) | 5.01 | 5.01 | 5.01 | 5.01 | 5.01 | 5.01 | 4.92 | 4.92 | 5.10 | 5.01 | 5.01 | 5.01 | 5.01 | 4.92 | 5.01 |

The abbreviations in the table represent the following meanings (the same applies to the following tables).

Kynar 761A: Polyvinylidene fluoride (PVDF) (manufactured by Arkema, Kynar (registered trademark) 761A, Mw=550,000)

K80: Polyvinylpyrrolidone (PVP) (manufactured by Nippon Shokubai Co., Ltd., PVP K80, Mw=900,000)

Manufacture of Hollow Fiber Membrane (Porous Membrane)

Example A1

(Manufacture of Hollow Fiber Membrane (M-A1))

Multifilament of polyester fiber (formed of polyethylene terephthalate, a fineness of 417 dtex) was circularly knit into a cylindrical shape using a support manufacturing device, heat treatment was performed thereon at 210° C., and thereby a support was obtained. The outer diameter of the obtained support was 1.45 mm.

A hollow fiber membrane (a porous membrane in a hollow fiber membrane shape) was prepared using a manufacturing apparatus 1 illustrated in FIG. 1.

A prepared membrane-manufacturing stock solution (A1) was sent from a stock solution supply device 2 of the manufacturing apparatus 1 and applied to a support 4 by an application unit 3. The support 4 to which the membrane-manufacturing stock solution had been applied was immersed in a coagulation solution (40 mass % N,N-dimethylacetamide aqueous solution) in a coagulation bath 5 at a temperature of 77° C. to coagulate the membrane-manufacturing stock solution, and thereby a hollow fiber membrane precursor 6 having a porous layer was obtained.

A step of immersing the hollow fiber membrane precursor in hot water having a temperature of 60° C. and a step of immersing the precursor in a sodium hypochlorite aqueous solution were repeated, finally it was dried in a drying furnace heated to 115° C. for 3 minutes, and thereby a hollow fiber membrane (M-A1) was obtained.

Examples A2 to A7

(Manufacture of Hollow Fiber Membranes (M-A2) to (M-A7))

Except that each of the membrane-manufacturing stock solutions (A2) to (A7) was used instead of the membrane-manufacturing stock solution (A1), hollow fiber membranes (M-A2) to (M-A7) were manufactured in a similar method to that for the hollow fiber membrane (M-A1).

Comparative Examples A1 to A5

(Manufacture of Hollow Fiber Membranes (M'-A1) to (M'-A5))

Except that each of the membrane-manufacturing stock solution (A'1) to (A'5) was used instead of the membrane-manufacturing stock solution (A1), hollow fiber membranes (M'-A1) to (M'-A5) were manufactured in a similar method to that for the hollow fiber membrane (M-A1).

Ratios of respective polymers constituting the obtained hollow fiber membranes and thicknesses (μm), membrane outer diameters (μm), bubble point pressures (kPa), average pore sizes (μm), water permeability $W_{d20}$ (m$^3$/m$^2$/MPa/h), water permeability $W_{d100}$ (m$^3$/m$^2$/MPa/h), water permeability $W_{W100}$ (m$^3$/m$^2$/MPa/h), and hydrophilicities HP (no unit) of the obtained hollow fiber membranes are shown in Table 3.

TABLE 3

| | | | | | Examples | | | | | |
|---|---|---|---|---|---|---|---|---|---|---|
| | | | | A1 | A2 | A3 | A4 | A5 | A6 | A7 |
| Hollow fiber membrane | | | | M-A1 | M-A2 | M-A3 | M-A4 | M-A5 | M-A6 | M-A7 |
| Composition of porous membrane | Polymer (A) | Vinylidene fluoride unit | (mass %) | 94.4 | 94.3 | 94.1 | 94.4 | 94.9 | 94.9 | 89.4 |
| | | | (mol %) | 98.1 | 98.0 | 97.8 | 97.9 | 97.7 | 97.9 | 96.3 |
| | Polymer (B) | MEA unit | (mass %) | 2.8 | 2.4 | 1.9 | 2.8 | 2.4 | 2.4 | 4.7 |
| | | | (mol %) | 1.43 | 1.23 | 0.97 | 1.43 | 1.22 | 1.22 | 2.49 |
| | | HEMA unit | (mass %) | 0.05 | 0.4 | 0.9 | 0.05 | 0.4 | 0.4 | 0.79 |
| | | | (mol %) | 0.03 | 0.20 | 0.46 | 0.03 | 0.20 | 0.20 | 0.42 |
| | | PMMA-MM unit | (mass %) | 1.9 | 1.9 | 1.9 | 1.9 | 1.9 | 1.9 | 3.75 |
| | | | (mol %) | 0.0032 | 0.0032 | 0.0032 | 0.0070 | 0.0031 | 0.0031 | 0.0065 |
| | | MMA unit | (mass %) | — | — | — | — | — | — | — |
| | | | (mol %) | — | — | — | — | — | — | — |
| | | DMAEMA unit | (mass %) | — | — | — | — | — | — | — |
| | | | (mol %) | — | — | — | — | — | — | — |
| | Polymer (C) | Vinylpyrrolidone unit | (mass %) | 0.8 | 1.0 | 1.2 | 1.0 | 1.4 | 1.1 | 1.3 |
| | | | (mol %) | 0.48 | 0.60 | 0.72 | 0.60 | 0.83 | 0.65 | 0.81 |
| Membrane performance | Thickness (μm) | | | 122 | 110 | 106 | 120 | 124 | 121 | 126.6 |
| | Membrane outer diameter (μm) | | | 1673 | 1645 | 1661 | 1698 | 1668 | 1670 | 1673 |
| | Bubble point pressure (kPa) | | | 145 | 130 | 225 | 209 | 206 | 204 | 150 |
| | Average pore size (μm) | | | 0.15 | 0.17 | 0.16 | 0.15 | 0.13 | 0.15 | 0.17 |
| | $W_{d20}$ (m$^3$/m$^2$/MPa/h) | | | 21.7 | 23.9 | 12.9 | 25.4 | 20.9 | 27.1 | 24.7 |
| | $W_{d100}$ (m$^3$/m$^2$/MPa/h) | | | 21.7 | 24.9 | 13.7 | 27.4 | 20.2 | 28.5 | 24.7 |
| | $W_{w100}$ (m$^3$/m$^2$/MPa/h) | | | 32.4 | 27.5 | 18.0 | 32.3 | 24.5 | 30.7 | 30.4 |
| | Hydrophilicity HP | | | 0.7 | 0.9 | 0.7 | 0.8 | 0.9 | 0.9 | 0.8 |

TABLE 3-continued

| | | | | Comparative examples | | | | |
|---|---|---|---|---|---|---|---|---|
| | | | | A1 | A2 | A3 | A4 | A5 |
| | Hollow fiber membrane | | | M'-A1 | M'-A2 | M'-A3 | M'-A4 | M'-A5 |
| Composition of porous membrane | Polymer (A) | Vinylidene fluoride unit | (mass %) | 98.2 | 93.9 | 89.5 | 94.2 | 93.4 |
| | | | (mol %) | 99.0 | 96.6 | 95.3 | 99.1 | 96.1 |
| | Polymer (B) | MEA unit | (mass %) | — | — | 0.6 | 0.22 | — |
| | | | (mol %) | — | — | 0.32 | 0.11 | — |
| | | HEMA unit | (mass %) | — | 1.9 | 1.62 | — | 2.27 |
| | | | (mol %) | — | 0.96 | 0.87 | — | 1.15 |
| | | PMMA-MM unit | (mass %) | — | — | 2.31 | 0.71 | — |
| | | | (mol %) | — | — | 0.0039 | 0.0012 | — |
| | | MMA unit | (mass %) | — | 1.9 | — | — | 2.27 |
| | | | (mol %) | — | 1.3 | — | — | 1.5 |
| | | DMAEMA unit | (mass %) | — | 0.9 | — | — | — |
| | | | (mol %) | — | 0.38 | — | — | — |
| | Polymer (C) | Vinylpyrrolidone unit | (mass %) | 1.8 | 1.4 | 6.3 | 1.3 | 2.2 |
| | | | (mol %) | 1.05 | 0.83 | 3.87 | 0.79 | 1.30 |
| Membrane performance | Thickness (μm) | | | 120 | 97.1 | 105.3 | 125.4 | 124.3 |
| | Membrane outer diameter (μm) | | | 1655 | 1633 | 1662 | 1671 | 1663 |
| | Bubble point pressure (kPa) | | | 190 | 73 | 50 | 122 | 60 |
| | Average pore size (μm) | | | 0.3 | 0.12 | 0.38 | 0.22 | 0.22 |
| | $W_{d20}$ (m$^3$/m$^2$/MPa/h) | | | 0.0 | 14.2 | 24.8 | 11.2 | 10 |
| | $W_{d100}$ (m$^3$/m$^2$/MPa/h) | | | 0.0 | 33.6 | 29.6 | 25.1 | 11.7 |
| | $W_{w100}$ (m$^3$/m$^2$/MPa/h) | | | 42.0 | 35.8 | 30 | 30.9 | 10.4 |
| | Hydrophilicity HP | | | 0.0 | 0.4 | 0.8 | 0.4 | 1.0 |

The hollow fiber membranes of the present invention obtained in Examples A1 to A6 had HP values of 0.7 to 0.9 and high hydrophilicities, which obviously indicates that the hollow fiber membranes have high water permeability even in a dry state.

In addition, it is obvious that the hollow fiber membranes have a bubble point pressure of 100 kPa or higher and high filtration performance and mechanical properties.

Meanwhile, since the polymer (B) was not contained in Comparative example A1, the obtained hollow fiber porous membrane was hydrophobic and had a hydrophilicity HP of 0.

Since the polymer (B) did not include the unit (b1) in Comparative example A2, the obtained hollow fiber membrane had a value of hydrophilicity HP as low as 0.4 and did not have high hydrophilicity.

Since the concentration (mass %) of the unit (b1) included in the porous membrane is lower than the concentration (mass %) of the unit (b2) included in the porous membrane in Comparative example A3, the porous membrane had an uneven structure, and as a result, it had a low bubble point pressure of 50 kPa.

Since the unit (b2) was not included in the porous membrane in Comparative example A4, the porous membrane had a low hydrophilicity.

Since the concentration (mass %) of the unit (b1) included in the porous membrane was lower than the concentration (mass %) of the unit (b2) included in the porous membrane in Comparative example A5, the porous membrane had an uneven structure, and as a result, it had a low bubble point pressure of 60 kPa.

Example B1

(Manufacture of Hollow Fiber Membrane (M-B1))

Multifilament of polyester fiber (formed of polyethylene terephthalate, a fineness of 417 dtex) was circularly knit into a cylindrical shape using a support manufacturing device, heat treatment was performed thereon at 210° C., and thereby a support was obtained. The outer diameter of the obtained support was 1.45 mm.

A hollow fiber membrane (a porous membrane in a hollow fiber membrane shape) was prepared using the manufacturing apparatus 1 illustrated in FIG. 1.

The membrane-manufacturing stock solutions (B1) and (B2) were sent from the stock solution supply device 2 of the manufacturing apparatus 1 to a double tube nozzle and the membrane-manufacturing stock solution (B2) from an inside of the double tube nozzle and the membrane-manufacturing stock solution (B1) from an outside of the double tube nozzle were simultaneously applied to the support 4 by the application unit 3. The support 4 to which the membrane-manufacturing stock solutions had been applied was immersed in a coagulation solution (40 mass % N,N-dimethylacetamide aqueous solution) in the coagulation bath 5 at a temperature of 77° C. to coagulate the membrane-manufacturing stock solutions, and thereby a hollow fiber membrane precursor 6 having two porous precursor layers was obtained.

A step of immersing the hollow fiber membrane precursor in hot water having a temperature of 60° C. and a step of immersing the precursor in a sodium hypochlorite aqueous solution were repeated, finally it was dried in a drying furnace heated to 115° C. for 3 minutes, and thereby a hollow fiber membrane (M-B1) having the two porous layers (an inner layer and an outer layer) was obtained.

Examples B2 and B3

(Manufacture of Hollow Fiber Membranes (M-B2) and (M-B3))

Except that the thicknesses of the inner layer and the outer layer were changed as shown in Table 4, hollow fiber membranes (M-B2) and (M-B3) were obtained in a similar method to that for the hollow fiber membrane (M-B1).

Example B4

(Manufacture of Hollow Fiber Membrane (M-B4))

Except that the membrane-manufacturing stock solution (B2) was changed to the membrane-manufacturing stock solution (B3) and the thicknesses of the inner layer and the outer layer were changed as shown in Table 4, a hollow fiber membrane (M-B4) was obtained in a similar method to that for the hollow fiber membrane (M-B1).

Comparative Example B1

(Manufacture of Hollow Fiber Membrane (M'-B1))

Except that only the membrane-manufacturing stock solution (B2) was used, only the membrane-manufacturing stock solution (B2) was applied to the support 4, and the thickness was changed, a single-layered hollow fiber membrane was obtained in a similar manner to Example B1.

Comparative Example B2

(Manufacture of Hollow Fiber Membrane (M'-B2))

Except that the membrane-manufacturing stock solution (B1) was changed to the membrane-manufacturing stock solution (B2) and the thicknesses of the inner layer and the outer layer were changed, a hollow fiber membrane was obtained in a similar manner to Example B1.

Comparative Example B3

(Manufacture of Hollow Fiber Membrane (M'-B3))

Except that the membrane-manufacturing stock solution (B1) was changed to the membrane-manufacturing stock solution (B2), the membrane-manufacturing stock solution (B3) was changed to the membrane-manufacturing stock solution (B1), and the thicknesses of the inner layer and the outer layer were changed, a hollow fiber membrane was obtained in a similar manner to Example B4.

Ratios of respective polymers (of the inner layer and the outer layer) constituting the obtained hollow fiber membranes and thicknesses (μm) (of the inner layer and the outer layer), membrane outer diameters (μm), bubble point pressures (kPa), average pore sizes (μm), water permeability $W_{d20}$ (m³/m²/MPa/h), water permeability $W_{d100}$ (m³/m²/MPa/h), water permeability $W_{w100}$ (m³/m²/MPa/h), and hydrophilicities HP (no unit) of the obtained hollow fiber membranes are shown in Table 4.

TABLE 4

| | | Examples | | | | Comparative examples | | |
|---|---|---|---|---|---|---|---|---|
| | | B1 | B2 | B3 | B4 | B1 | B2 | B3 |
| Membrane-manufacturing stock solution for outer layer (part by mass) | PVDF | 1.2 | 1.2 | 1.2 | 1.2 | 1.2 | 1.2 | 1.2 |
| | Polymerization solution (D-2) | 0.30 | 0.30 | 0.30 | 0.30 | — | — | — |
| | K80 | 0.78 | 0.78 | 0.78 | 0.78 | 0.78 | 0.78 | 0.78 |
| | DMAc | 4.92 | 4.92 | 4.92 | 4.92 | 5.10 | 5.10 | 5.10 |
| Membrane-manufacturing stock solution for inner layer (part by mass) | PVDF | 1.2 | 1.2 | 1.2 | 1.2 | — | 1.2 | 1.2 |
| | Polymerization solution (D-2) | — | — | — | 0.15 | — | — | 0.30 |
| | K80 | 0.78 | 0.78 | 0.78 | 0.78 | — | 0.78 | 0.78 |
| | DMAc | 5.10 | 5.10 | 5.10 | 5.01 | — | 5.10 | 4.92 |
| Coagulation solution (part by mass) | DMAc | 40 | 40 | 40 | 40 | 40 | 40 | 40 |
| | Deionized water | 60 | 60 | 60 | 60 | 60 | 60 | 60 |
| Number of porous layers | | 2 | 2 | 2 | 2 | 1 | 2 | 2 |
| Hollow fiber membrane | Thickness of outer layer (μm) | 33 | 68 | 98 | 64 | 120 | 69 | 65 |
| | Composition of outer layer (mass %) PVDF | 91.0 | 90.9 | 91.0 | 91.0 | 100 | 100 | 100 |
| | MEA unit | 4.6 | 4.7 | 4.6 | 4.6 | 0 | 0 | 0 |
| | HEMA unit | 0.8 | 0.8 | 0.8 | 0.8 | 0 | 0 | 0 |
| | Macromonomer (b3-1) unit | 3.6 | 3.6 | 3.6 | 3.6 | 0 | 0 | 0 |
| | (B)/(A) of outer layer (mass ratio) | 0.1 | 0.1 | 0.1 | 0.1 | 0 | 0 | 0 |
| | Thickness of inner layer (μm) | 90 | 63 | 39 | 69 | — | 61 | 58 |
| | Composition of inner layer (mass %) PVDF | 100 | 100 | 100 | 95.2 | — | 100 | 91.0 |
| | MEA unit | 0 | 0 | 0 | 2.4 | — | 0 | 4.6 |
| | HEMA unit | 0 | 0 | 0 | 0.4 | — | 0 | 0.8 |
| | Macromonomer (b3-1) unit | 0 | 0 | 0 | 1.9 | — | 0 | 3.6 |
| | (B)/(A) of inner layer (mass ratio) | 0 | 0 | 0 | 0.05 | — | 0 | 0.1 |
| | Membrane outer diameter (μm) | 1679 | 1682 | 1683 | 1688 | 1655 | 1648 | 1677 |
| | Bubble point pressure (kPa) | 211 | 206 | 209 | 210 | 190 | 203 | 201 |
| | Average pore size (μm) | 0.3 | 0.3 | 0.3 | 0.3 | 0.3 | 0.3 | 0.3 |
| | $W_{d100}$ (m³/m²/MPa/h) | 20.7 | 18.5 | 20.2 | 22.1 | 0.0 | 0.0 | 0.0 |
| | $W_{w100}$ (m³/m²/MPa/h) | 21.6 | 20.1 | 22.7 | 23.5 | 42.0 | 40.1 | 24.8 |
| | $W_{d100}/W_{w100}$ | 1.0 | 0.9 | 0.9 | 0.9 | 0.0 | 0.0 | 0.0 |

<Accelerated Filtration Test-1 in Activated Sludge>

Figure 2:
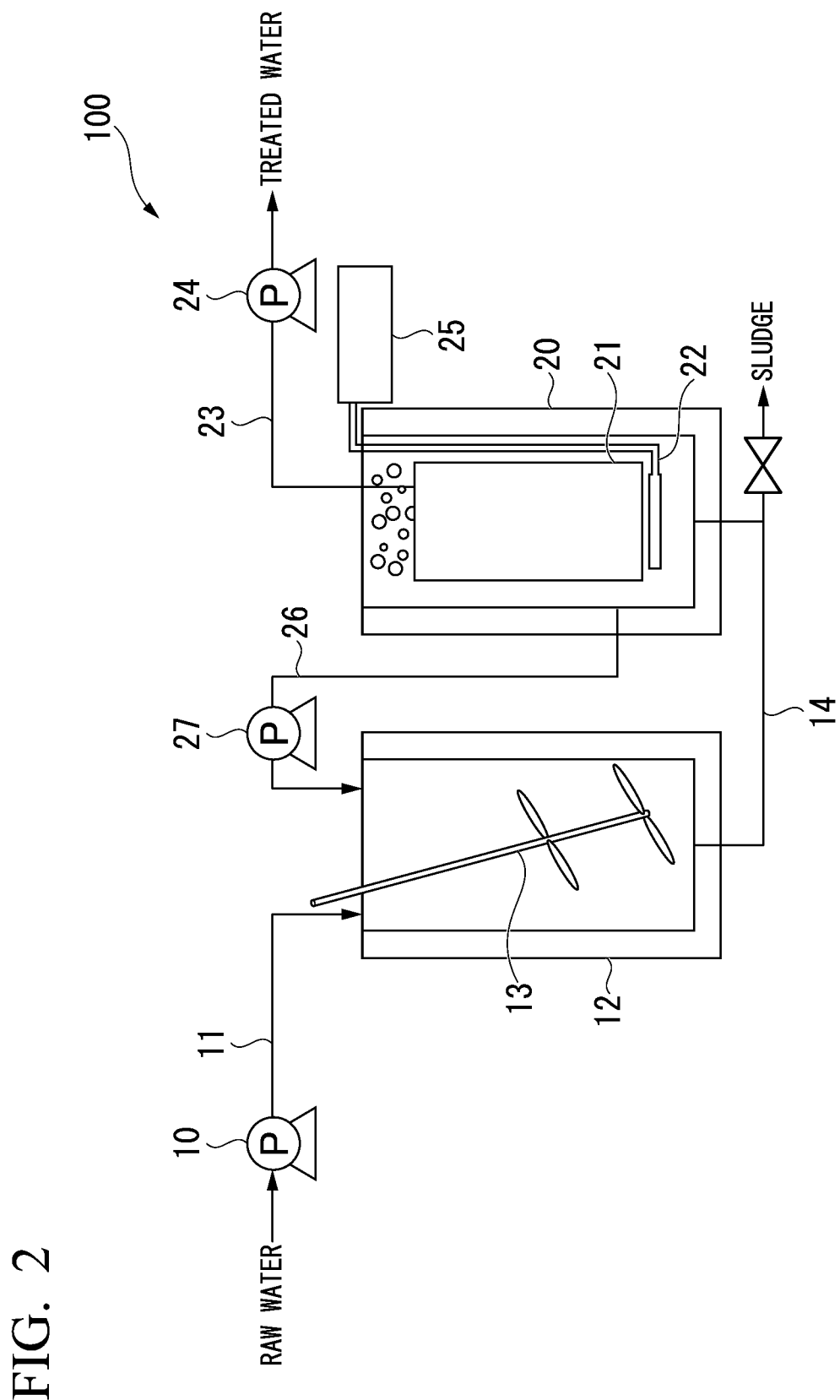
FIG. 2 is a schematic diagram of a device that is used to perform a filtration test of the porous membrane of the present invention.

A filtration process of water to be treated was performed using a water treatment system 100 illustrated in FIG. 2.

The water treatment system 100 has a raw water pump 10, a raw water channel 11, a nitrification tank 12, a stirrer 13, a circulation channel 14, a bioreactor 20, a separation membrane module 21, an aeration tube 22, a treated water channel 23, a filtering pump 24, a blower 25, a circulation channel 26, and a circulation pump 27.

32 porous membranes each from M-A1 to M-A3, M'-A1, and M'-A2 of Examples and Comparative examples shown in Table 5 accumulated in parallel to each other were arranged as the separation membrane module 21 of the water treatment system 100 which is an immersion type membrane separation activated sludge to be immersed in the bioreactor. A filtration test was performed under the conditions shown in Table 5 under aeration using normal domestic wastewater for raw water.

The results are shown in Table 5.

Figure 3:
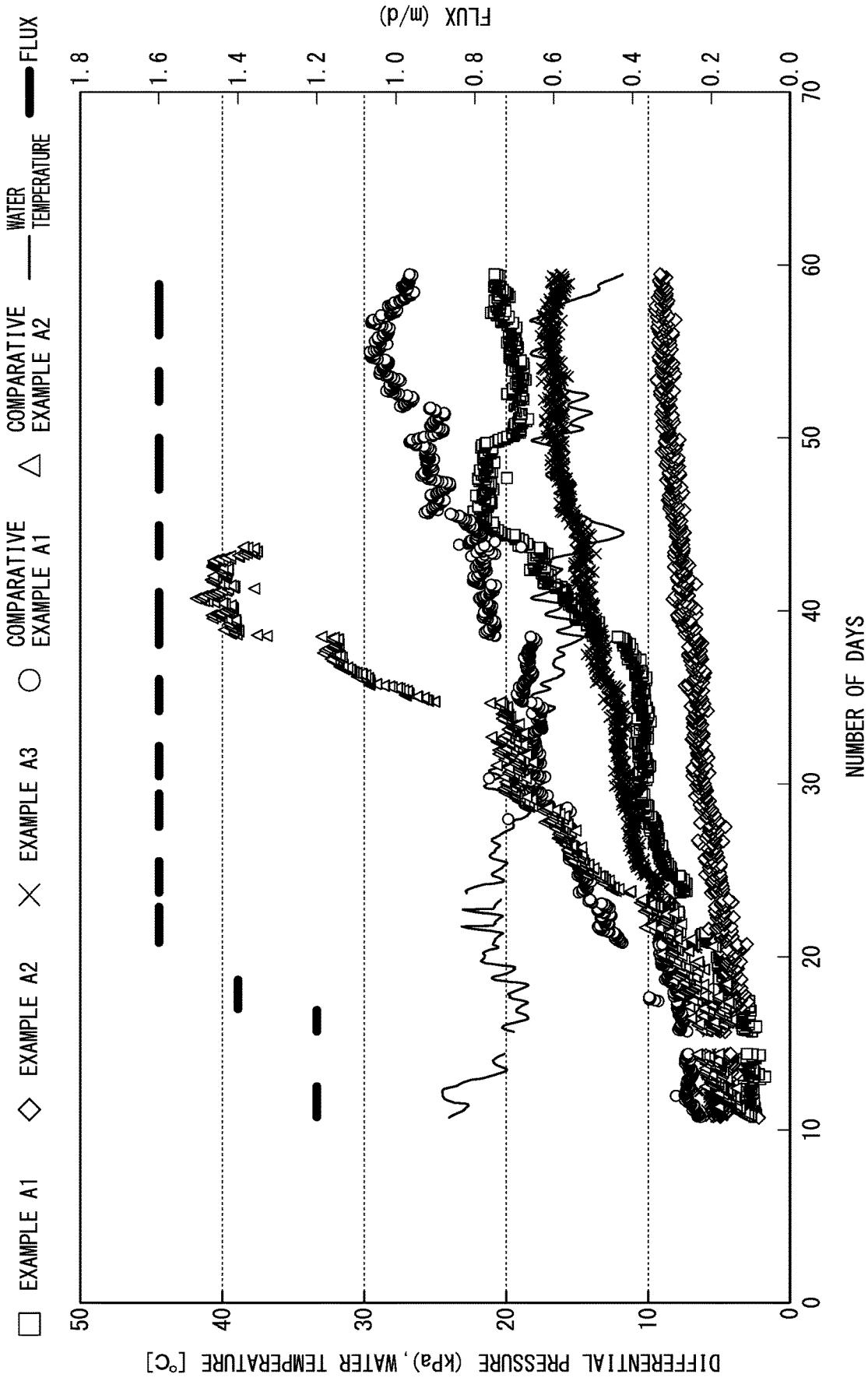
FIG. 3 is a diagram illustrating an example of results of a filtration test according to Examples.

In addition, FIG. 3 illustrates a graph of temporal changes in differential pressure. Further, differential pressure mentioned here is operational pressure of the filtration pump required for treating water at a predetermined flow rate and practically indicates an inter-membrane pressure difference with respect to an inside and an outside of a membrane (the same applies to Accelerated filtration test-2 which will be described below). Further, FIG. 3 also shows temperatures inside the bioreactor and fluxes (unit: m/day, which is denoted by m/d in the drawing) of water to be treated by the separation membrane module per day in addition to differential pressure in order to facilitate understanding the specific operation state.

occurred during the filtration test occurred, and the membrane exhibited a sharp rise in inter-membrane differential pressure and inferior anti-fouling properties as it was not possible to continue the filtration test further in comparison to the hollow fiber membranes (M-A1) to (M-A3) in which the polymer (B) having the unit (b1) was used.

TABLE 5

|  |  | Example A1 | Example A2 | Example A3 | Comparative example A1 | Comparative example A2 |
|---|---|---|---|---|---|---|
| Hollow fiber membrane |  | M-A1 | M-A2 | M-A3 | M'-A1 | M'-A2 |
| Environment inside tank | MLSS |  |  | 7,000 to 10,000 |  |  |
|  | Viscosity (mPa · s) |  |  | 20 to 30 |  |  |
|  | Temperature (° C.) |  |  | 11 to 25 |  |  |
| Operation conditions |  |  |  | 1.2 m/day 6 days + 1.4 m/day 4 days + 1.6 m/day 39 days |  |  |
| Initial inter-membrane differential pressure (kPa) |  | 5.58 | 4.92 | 5.21 | 6.30 | 3.11 |
| Differential pressure at the end of test (kPa) |  | 20.91 | 9.16 | 16.56 | 27.06 | Not possible to measure |
| Rising pressure (kPa) |  | 15.33 | 4.24 | 11.35 | 20.76 | — |

The abbreviations in the table represent the following meanings (the same applies to the following tables).

MLSS: This is a concentration of a suspended substance inside the tank expressed with the unit of mg/L, and the higher MLSS, the higher the concentration of sludge contained in the tank.

Since the hollow fiber membranes (M-A1) to (M-A3) of Examples A1 to A3 used the polymer (B) having the unit (b1), the membranes exhibited a mitigated rise in inter-membrane differential pressure in the filtration test and excellent anti-fouling properties.

On the other hand, since the hollow fiber membrane (M'-A1) of Comparative example A1 did not use the polymer (B) having the unit (b1), fouling in which the membrane is contaminated occurred during the filtration test, and the membrane exhibited a rise in inter-membrane differential pressure and inferior anti-fouling properties in comparison to the hollow fiber membranes (M-A1) to (M-A3) in which the polymer (B) having the unit (b1) was used.

In addition, although the hollow fiber membrane (M'-A2) of Comparative example A2 used the polymer having a unit based on 2-hydroxyethyl methacrylate that is the unit (b2), the polymer was not the polymer (B) also having the unit (l1), thus fouling in which the membrane is contaminated (Accelerated Filtration Test-2 in Activated Sludge)

As shown in Table 6, a filtration test was performed in a similar manner to Accelerated filtration test-1 in activated sludge except that the hollow fiber membranes, the environments inside the tank, and the operation conditions were changed.

The results are shown in Table 6.

Figure 4:
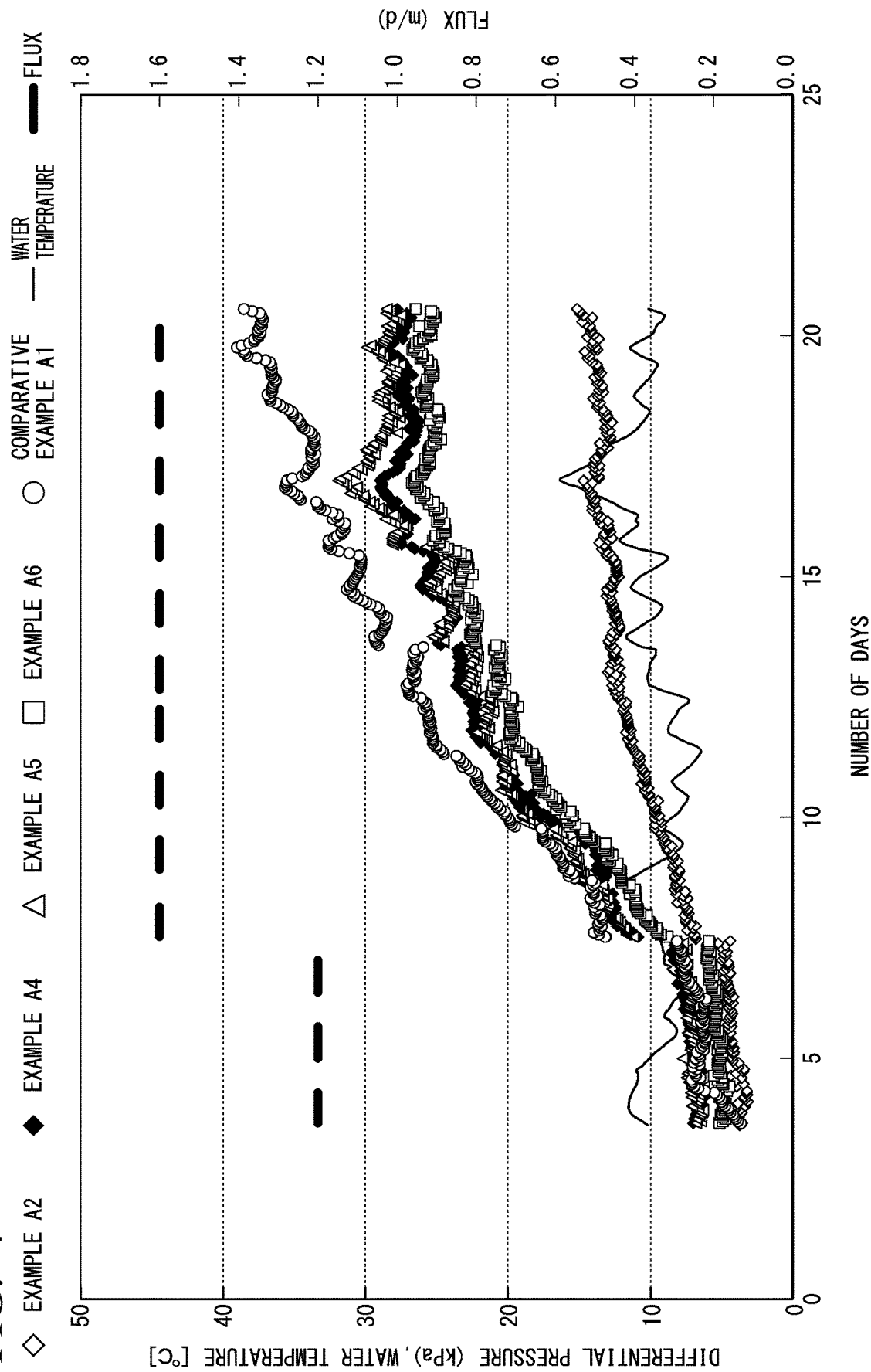
FIG. 4 is a diagram illustrating an example of results of a filtration test according to Examples.

In addition, FIG. 4 illustrates a graph of temporal changes in differential pressure. Further, FIG. 4 also shows temperatures inside the bioreactor and fluxes (unit: m/day, which is denoted by m/d in the drawing) of water to be treated by the separation membrane module per day in addition to differential pressure in order to facilitate understanding the specific operation state.

TABLE 6

|  |  | Example A2 | Example A4 | Example A5 | Example A6 | Comparative example A1 |
|---|---|---|---|---|---|---|
| Hollow fiber membrane |  | M-A2 | M-A4 | M-A5 | M-A6 | M'-A1 |
| Environment inside tank | MLSS |  |  | 9,000 to 12,000 |  |  |
|  | Viscosity (mPa · s) |  |  | 25 to 35 |  |  |
|  | Temperature (° C.) |  |  | 7 to 11 |  |  |
| Operation conditions |  |  |  | 1.2 m/day 7 days + 1.6 m/day 14 days |  |  |
| Initial inter-membrane differential pressure (kPa) |  | 3.70 | 6.98 | 6.78 | 5.14 | 3.64 |
| Differential pressure at the end of test (kPa) |  | 15.13 | 28.30 | 28.90 | 26.25 | 38.11 |
| Rising pressure (kPa) |  | 11.43 | 21.32 | 22.12 | 21.11 | 34.47 |

Since the hollow fiber membranes (M-A2) and (M-A4) to (M-A6) of Examples A2 and A4 to A6 used the polymer (B) having the unit (b1), the membranes exhibited a mitigated rise in inter-membrane differential pressure during the filtration test and excellent anti-fouling properties.

On the other hand, since the hollow fiber membrane (M'-A1) of Comparative example A1 did not use the polymer (B) having the unit (b1) as in Accelerated filtration test-1 in activated sludge, fouling in which the membrane is contaminated occurred therein even during a filtration test performed under changed conditions, and the membrane exhibited a rise in inter-membrane differential pressure and inferior anti-fouling properties in comparison to the hollow fiber membranes (M-A2) and (M-A4) to (M-A6) in which the polymer (B) having the unit (b1) was used.

INDUSTRIAL APPLICABILITY

The porous membrane of the present invention is preferable as a porous membrane used in the water treatment field such as drinking water production, water treatment, wastewater treatment and the like. Particularly, a hollow porous membrane and a hollow fiber membrane module using the porous membrane of the present invention are preferable for water treatment devices of the membrane bioreactor method (MBR method).

REFERENCE SIGNS LIST

1 Manufacturing apparatus
10 Raw water pump
100 Water treatment system
11 Raw water channel
12 Nitrification tank
13 Stirrer
14 Circulation channel
2 Stock solution supply device
20 Bioreactor
21 Separation membrane module
22 Aeration tube
23 Treated water channel
24 Filtering pump
25 Blower
26 Circulation channel
27 Circulation pump
3 Application unit
4 Support
5 Coagulation bath
6 Hollow fiber membrane precursor

The invention claimed is:
1. A porous membrane, comprising polymer (A) and polymer (B), wherein
the polymer (A) is a membrane-forming polymer,
the polymer (B) is a polymer comprising
a unit (b1) represented by formula (1) below:

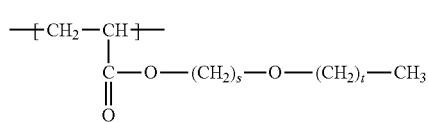

wherein, in formula (1), s is 2 or 3 and t is an integer of 0 to 2,
a unit (b2) based on hydroxyl group-containing (meth)acrylate, and
a unit (b3) comprising a group represented by formula (2) below:

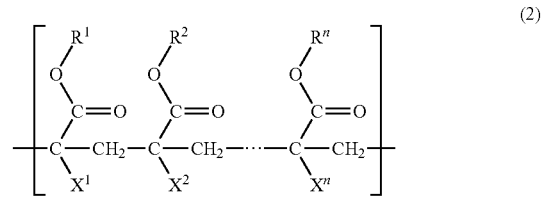

wherein, in formula (2), $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000, and
the concentration (mass %) of the unit (b1) is equal to or higher than the concentration (mass %) of the unit (b2) in the porous membrane.

2. The porous membrane according to claim 1, wherein the unit (b1) is based on 2-methoxyethyl acrylate.

3. The porous membrane according to claim 1, which is a porous membrane that filtrates water to be treated to turn the water to be treated into treated water, and which comprises:
a plurality of porous layers comprising the polymer (A), wherein, among the plurality of porous layers, the concentration (mass %) of the polymer (B) among all polymers comprised in at least an outermost layer of the porous membrane on a side of the water to be treated is higher than the concentration (mass %) of the polymer (B) among all the polymers comprised in the porous layers other than the outermost layer.

4. The porous membrane according to claim 1, wherein a for of the membrane is a hollow fiber membrane.

5. The porous membrane according to claim 1, further comprising a support.

6. A membrane module, comprising:
the porous membrane according to claim 1.

7. A water treatment device, comprising:
the membrane module according to claim 6.

8. A method for manufacturing a porous membrane, the method comprising manufacturing a porous membrane precursor using a membrane-manufacturing stock solution comprising a polymer (A), a polymer (B), and a polymer (C) comprising a unit based on vinyl pyrrolidone, and removing some or all of the entire polymer (C) from the porous membrane precursor, wherein
the polymer (A) is a membrane-forming polymer,
the polymer (B) is a polymer comprising
a unit (b1) represented by formula (1) below:

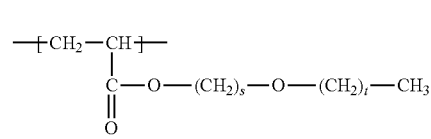

wherein, in formula (1), s is 2 or 3, and t is an integer of 0 to 2,
a unit (b2) based on hydroxyl group-containing (meth)acrylate, and
a unit (b3) comprising a group represented by formula (2) below:

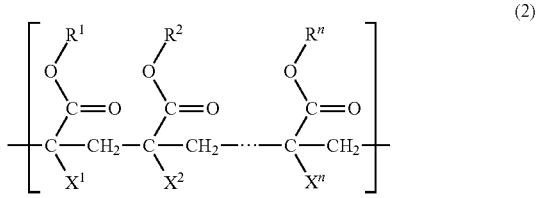
(2)

wherein, in formula (2), $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000, and the concentration (mass %) of the unit (b1) is equal to or higher than the concentration (mass %) of the unit (b2) in the membrane-manufacturing stock solution.

9. The method according to claim 8, wherein the unit (b1) is based on 2-methoxyethyl acrylate.

10. A method for manufacturing a porous membrane which filtrates water to be treated to turn the water to be treated into treated water, the porous membrane comprising a plurality of porous layers comprising a polymer (A), the method comprising manufacturing a porous membrane precursor comprising a plurality of porous precursor layers each corresponding to a plurality of membrane-manufacturing stock solutions comprising the polymer (A) and a polymer (C) which comprises a unit based on vinyl pyrrolidone using the plurality of membrane-manufacturing stock solutions, and removing some or all of the polymer (C) from the porous membrane precursor, wherein, among the plurality of membrane-manufacturing stock solutions, a membrane-manufacturing stock solution at least associated with an outermost layer of the porous membrane on a side of the water to be treated further comprises a polymer (B), and wherein the concentration (mass %) of the polymer (B) among all polymers comprised in the membrane-manufacturing stock solution associated with the outermost layer is higher than the concentration (mass %) of the polymer (B) among all polymers comprised in a membrane-manufacturing stock solution associated with a porous layer other than the outermost layer, and the polymer (B) is a polymer comprising a unit (b1) represented by formula (1) below:

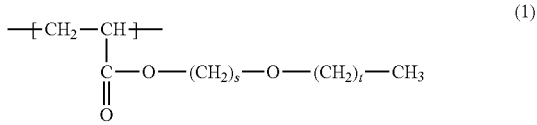
(1)

wherein, in formula (1), s is 2 or 3 and t is an integer of 0 to 2, a unit (b2) based on hydroxyl group-containing (meth) acrylate, and a unit (b3) comprising a group represented by formula (2) below:

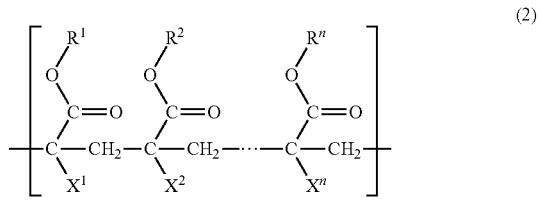
(2)

wherein, in formula (2), $R^1$ to $R^n$ each independently represent a hydrogen atom, an alkyl group, a cycloalkyl group, an aryl group, or a heterocyclic group, $X^1$ to $X^n$ each independently represent a hydrogen atom or a methyl group, and n is an integer of 3 to 10,000.

11. The porous membrane according to claim 1, wherein a concentration of the unit (b3) among all the units constituting the polymer (B) is 10 to 45 mass %.

12. The porous membrane according to claim 1, which comprises an outermost layer wherein a concentration of the polymer (B) is 0.1 to 40 mass %.

13. The porous membrane according to claim 1, which has a bubble point pressure of 100 kPa or higher, and an HP value of 0.7 to 0.9.

14. The porous membrane according to claim 1, which has a bubble point pressure of 130 to 225 kPa, and an HP value of 0.7 to 0.9.

15. The method according to claim 8, wherein the porous membrane has a bubble point pressure of 100 kPa or higher, and an HP value of 0.7 to 0.9.

16. The method according to claim 8, wherein the porous membrane has a bubble point pressure of 130 to 225 kPa, and an HP value of 0.7 to 0.9.

17. The method according to claim 10, wherein the porous membrane has a bubble point pressure of 100 kPa or higher, and an HP value of 0.7 to 0.9.

18. The method for manufacturing a porous membrane according to claim 10, wherein the porous membrane has a bubble point pressure of 130 to 225 kPa, and an HP value of 0.7 to 0.9.

* * * * *